(12) United States Patent
Huynh

(10) Patent No.: US 10,829,203 B2
(45) Date of Patent: Nov. 10, 2020

(54) DISTRIBUTED TRAILING EDGE WING FLAP SYSTEMS

(71) Applicant: The Boeing Company, Chicago, IL (US)

(72) Inventor: Neal V. Huynh, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 427 days.

(21) Appl. No.: 15/947,595

(22) Filed: Apr. 6, 2018

(65) Prior Publication Data
US 2019/0308719 A1 Oct. 10, 2019

(51) Int. Cl.
*B64C 13/40* (2006.01)
*B64C 9/16* (2006.01)
(Continued)

(52) U.S. Cl.
CPC .......... *B64C 13/40* (2013.01); *B64C 9/16* (2013.01); *B64C 13/42* (2013.01); *B64C 13/50* (2013.01);
(Continued)

(58) Field of Classification Search
CPC ....... B64C 13/40; B64C 13/505; B64C 13/42; B64C 13/50; B64C 13/503; B64C 9/16
See application file for complete search history.

(56) References Cited

U.S. PATENT DOCUMENTS

| 6,799,739 | B1 | 10/2004 | Jones | |
| 7,048,234 | B2 * | 5/2006 | Recksiek | B64D 45/0005 244/213 |

(Continued)

FOREIGN PATENT DOCUMENTS

| EP | 1721825 | 11/2006 |
| EP | 1721826 | 11/2006 |

(Continued)

OTHER PUBLICATIONS

European Patent Office, "Extended European Search Report," issued in connection with European Patent Application No. 19166351.7 dated Aug. 5, 2019, 6 pages.

(Continued)

*Primary Examiner* — Justin M Benedik
(74) *Attorney, Agent, or Firm* — Hanley, Flight & Zimmerman, LLC

(57) ABSTRACT

Distributed trailing edge wing flap systems are described. An example wing flap system for an aircraft includes a flap, a first actuator, a second actuator, and a shaft. The flap is movable between a deployed position and a retracted position relative to a fixed trailing edge of a wing of the aircraft. The first actuator is to move the flap relative to the fixed trailing edge. The first actuator is actuatable via pressurized hydraulic fluid to be supplied from a hydraulic system of the aircraft to the first actuator via a hydraulic module operatively coupled to the first actuator. The second actuator is to move the flap relative to the fixed trailing edge. The second actuator is actuatable via an electric motor of the second actuator connected to a first electrical system of the aircraft. The shaft operatively couples the first actuator to the second actuator. The first and second actuators are actuatable via the shaft.

21 Claims, 14 Drawing Sheets

(51) Int. Cl.
*B64C 13/50* (2006.01)
*B64C 13/42* (2006.01)
*F15B 15/28* (2006.01)
*F15B 20/00* (2006.01)
(52) U.S. Cl.
CPC .......... *B64C 13/503* (2013.01); *B64C 13/505* (2018.01); *F15B 15/2815* (2013.01); *F15B 20/002* (2013.01)

(56) References Cited

U.S. PATENT DOCUMENTS

| | | | |
|---|---|---|---|
| 2004/0075020 A1* | 4/2004 | Trikha | B64C 13/505 244/99.4 |
| 2006/0043242 A1 | 3/2006 | Benson | |
| 2006/0144996 A1 | 7/2006 | Carl et al. | |
| 2010/0089053 A1 | 4/2010 | Hanlon et al. | |
| 2010/0288886 A1* | 11/2010 | Schievelbusch | B64D 45/0005 244/194 |
| 2011/0062282 A1* | 3/2011 | Richter | B64D 45/0005 244/99.4 |
| 2014/0175216 A1 | 6/2014 | Ishihara | |
| 2015/0090843 A1 | 4/2015 | Guering | |
| 2018/0156293 A1 | 6/2018 | Fox et al. | |
| 2019/0217944 A1 | 7/2019 | Huynh | |
| 2019/0291850 A1 | 9/2019 | Huynh | |
| 2020/0070959 A1 | 3/2020 | Huynh | |
| 2020/0079497 A1 | 3/2020 | Huynh | |

FOREIGN PATENT DOCUMENTS

| | | |
|---|---|---|
| EP | 2202146 | 6/2010 |
| EP | 2524865 | 11/2012 |
| EP | 2955104 | 12/2015 |
| EP | 3121116 | 1/2017 |
| EP | 3549857 | 10/2019 |

OTHER PUBLICATIONS

United States Patent and Trademark Office, "Requirement for Restriction," issued in connection with U.S. Appl. No. 15/926,477, dated Jul. 20, 2020, 6 pages.

European Patent Office, "Extended European Search Report," issued in connection with European Patent Application No. 19193891.9, dated Feb. 12, 2020, 11 pages.

United States Patent and Trademark Office, "Non-Final Office Action," issued in connection with U.S. Appl. No. 16/126,671, dated Aug. 6, 2020, 7 pages.

United States Patent and Trademark Office, "Non-Final Office Action," issued in connection with U.S. Appl. No. 15/874,545, dated Aug. 18, 2020, 7 pages.

United States Patent and Trademark Office, "Non-Final Office Action," issued in connection with U.S. Appl. No. 16/122,519, dated Aug. 6, 2020, 6 pages.

* cited by examiner

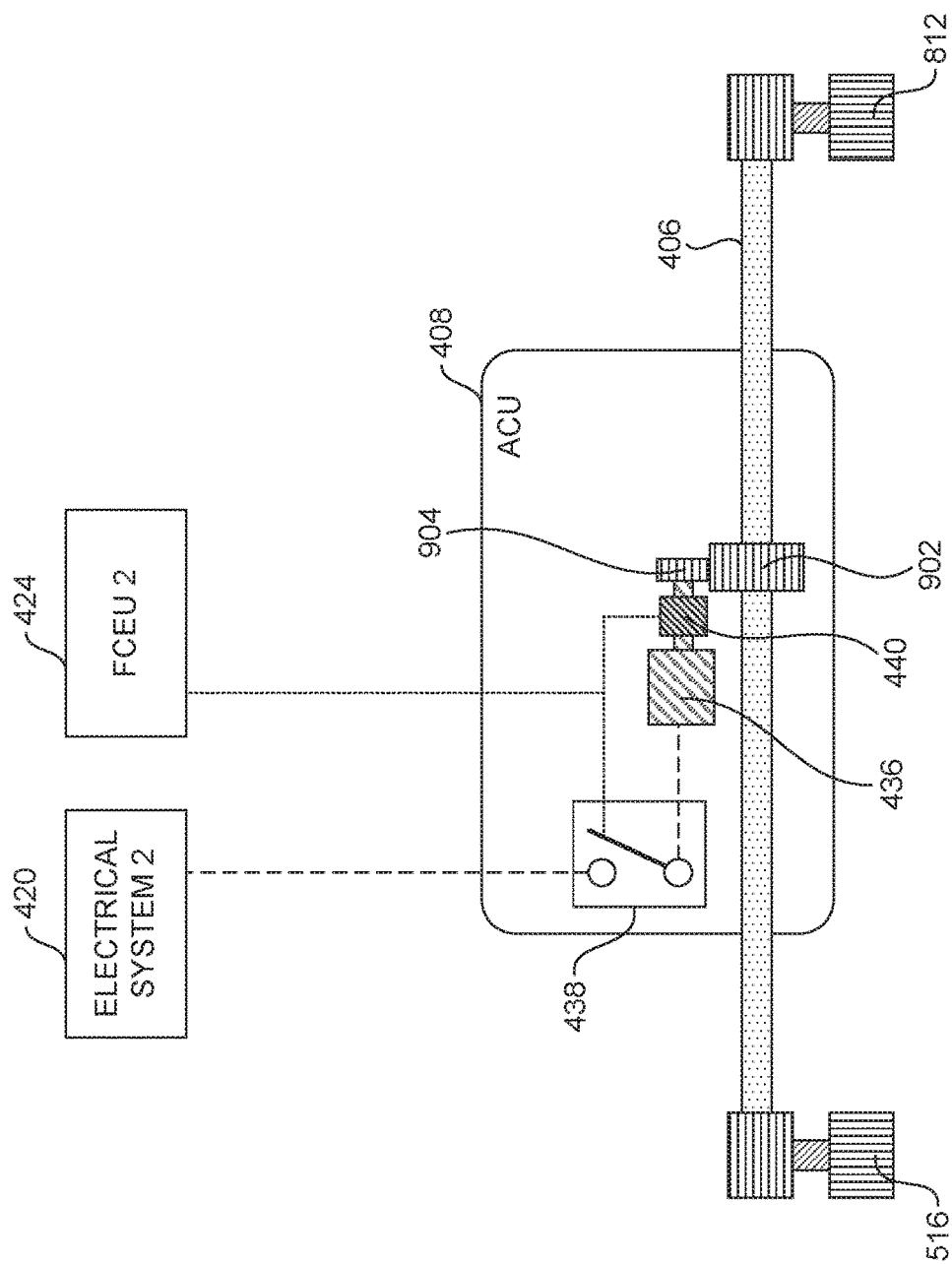

DISTRIBUTED TRAILING EDGE WING FLAP SYSTEMS

FIELD OF THE DISCLOSURE

This disclosure relates generally to aircraft wing flaps and, more specifically, to distributed trailing edge wing flap systems.

BACKGROUND

Aircraft wings (e.g., the wings of a commercial aircraft) commonly include flaps (e.g., outboard flaps and/or inboard flaps) located at and/or along the respective fixed trailing edge of each aircraft wing. The flaps are movable relative to the fixed trailing edges of the aircraft wings between retracted and deployed positions. Deploying the flaps from the aircraft wings during flight (e.g., during landing) typically increases a lift characteristic associated with the aircraft wings, while retracting the flaps during flight (e.g., during cruise) typically reduces the lift characteristic.

SUMMARY

Distributed trailing edge wing flap systems are disclosed herein. In some disclosed examples, a wing flap system comprises a flap, a first actuator, a second actuator, and a shaft. In some disclosed examples, the flap movable between a deployed position and a retracted position relative to a fixed trailing edge of a wing of the aircraft. In some disclosed examples the first actuator is to move the flap relative to the fixed trailing edge. In some disclosed examples, the first actuator is actuatable via pressurized hydraulic fluid to be supplied from a hydraulic system of the aircraft to the first actuator via a hydraulic module operatively coupled to the first actuator. In some disclosed examples, the second actuator is to move the flap relative to the fixed trailing edge. In some disclosed examples, the second actuator is actuatable via an electric motor of the second actuator connected to a first electrical system of the aircraft. In some disclosed examples the shaft operatively couples the first actuator to the second actuator. In some disclosed examples, the first and second actuators are actuatable via the shaft.

In some examples, a wing flap system comprises a flap, a first actuator, a second actuator, a shaft, and an alternate control unit. In some disclosed examples, the flap is movable between a deployed position and a retracted position relative to a fixed trailing edge of a wing of the aircraft. In some disclosed examples, the first actuator is to move the flap relative to the fixed trailing edge. In some disclosed examples, the first actuator is actuatable via pressurized hydraulic fluid to be supplied from a hydraulic system of the aircraft to the first actuator via a hydraulic module operatively coupled to the first actuator. In some disclosed examples, the second actuator is to move the flap relative to the fixed trailing edge. In some disclosed examples, the second actuator is actuatable via an electric motor of the second actuator connected to a first electrical system of the aircraft. In some disclosed examples, the shaft extends between the first and second actuators. In some disclosed examples, the shaft operatively couples the first actuator to the second actuator. In some disclosed examples, the first and second actuators are actuatable via the shaft. In some disclosed examples, the alternate control unit includes an alternate electric motor and a switch. In some disclosed examples, the alternate control unit is to selectively rotate the shaft in response to a second electrical system of the aircraft being connected to the alternate electric motor via the switch.

In some examples, a method is disclosed. In some disclosed examples, the method comprises commanding a first actuator and a second actuator to move a flap relative to a fixed trailing edge of a wing of an aircraft. In some disclosed examples, the first actuator is actuatable via pressurized hydraulic fluid to be supplied from a hydraulic system of the aircraft to the first actuator via a hydraulic module operatively coupled to the first actuator. In some disclosed examples, the second actuator is actuatable via an electric motor of the second actuator connected to an electrical system of the aircraft. In some disclosed examples, the method further comprises, in response to detecting a failure of the first actuator or the hydraulic system, commanding the first actuator into a bypassed mode and further commanding the second actuator to move the flap relative to the fixed trailing edge. In some disclosed examples, the method further comprises, in response to detecting an asymmetry between the flap of the wing and another flap of another wing of the aircraft while the first actuator is in the bypassed mode, commanding the second actuator into a floated mode and further commanding an alternate control unit of the aircraft into an active mode. In some disclosed examples, the active mode enables the alternate control unit to move the flap relative to the fixed trailing edge to reduce the asymmetry.

BRIEF DESCRIPTION OF THE DRAWINGS

FIG. 9 is a schematic of the example shaft and the example ACU of FIG. 4.

Figure 1:
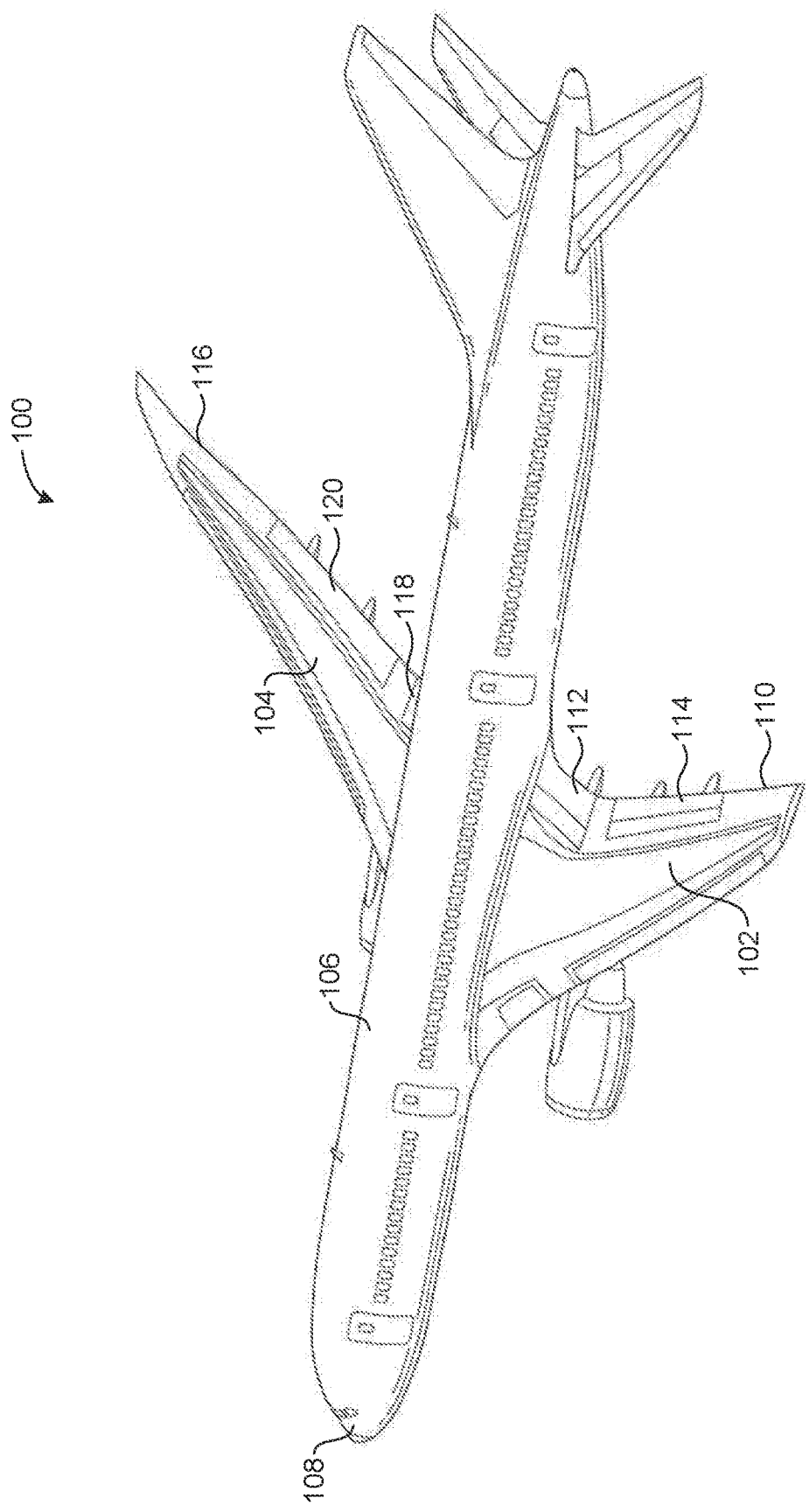
FIG. 1 illustrates an example aircraft in which an example distributed trailing edge wing flap system may be implemented in accordance with the teachings of this disclosure.

Certain examples are shown in the above-identified figures and described in detail below. In describing these examples, like or identical reference numbers are used to identify the same or similar elements. The figures are not necessarily to scale, and certain features and certain views of the figures may be shown exaggerated in scale or in schematic for clarity and/or conciseness.

DETAILED DESCRIPTION

Aircraft wings (e.g., the wings of a commercial aircraft) commonly include flaps (e.g., outboard flaps and/or inboard flaps) located at and/or along the respective fixed trailing edge of each aircraft wing. Conventional trailing edge wing flap systems may include actuators and/or ball screws arranged to move the flaps relative to the fixed trailing edges of the aircraft wings between retracted and deployed positions. In such conventional trailing edge wing flap systems, the actuators are connected via torque tubes to a power drive unit which is powered by multiple independent hydraulic or electrical systems of the aircraft. The actuators of such conventional trailing edge wing flap systems may be rendered inoperable in the event of a partial or complete failure of one or more of the hydraulic or electrical system(s), thereby leaving the aircraft without the ability to change and/or control the respective positions of the wing flaps (e.g., without the ability to maintain and/or to actuate a wing flap to the last commanded position of the wing flap).

In contrast to the conventional trailing edge wing flap systems described above, the example distributed trailing edge wing flap systems disclosed herein advantageously include a hydromechanical actuator and an electromechanical actuator to move a wing flap relative to the fixed trailing edge of an aircraft wing. The hydromechanical actuator is actuatable via pressurized hydraulic fluid to be supplied from a hydraulic system of the aircraft to the hydromechanical actuator via a hydraulic module operatively coupled to the hydromechanical actuator. The electromechanical actuator is actuatable via an electric motor of the electromechanical actuator connected to an electrical system of the aircraft. A shaft operatively couples the hydromechanical actuator to the electromechanical actuator. Rotation of the shaft may be selectively controlled via an alternate control unit operatively coupled to the shaft.

The hydromechanical actuator may advantageously be actuated by any of three independent mechanisms. First, the hydromechanical actuator may be actuated via the hydraulic module when the hydraulic system is operational, functional, and/or active. Second, in the event of a failure of the hydraulic system, the hydromechanical actuator may alternatively be actuated via the shaft under the control of the electromechanical actuator. Third, in the event of a failure of the hydraulic system and a failure of an electrical system, the hydromechanical actuator may alternatively be actuated via the shaft under the control of the alternate control unit.

The electromechanical actuator may also advantageously be actuated by any of three independent mechanisms. First, the electromechanical actuator may be actuated via the electric motor when the electrical system is operational, functional, and/or active. Second, in the event of a failure of the electrical system, the electromechanical actuator may alternatively be actuated via the shaft under the control of the hydromechanical actuator. Third, in the event of a failure of the electrical system and a failure of the hydraulic system, the electromechanical actuator may alternatively be actuated via the shaft under the control of the alternate control unit.

In some examples, the disclosed distributed trailing edge wing flap systems may be implemented by and/or integrated into an aircraft having a fly-by-wire flight control system and a power architecture including two independent hydraulic systems and two independent electrical systems (e.g., a 2H2E power architecture). In some such examples, the electrical systems of the aircraft may be operable at low voltage power (e.g., 115 VAC or 28 VDC).

FIG. 1 illustrates an example aircraft 100 in which an example distributed trailing edge wing flap system may be implemented in accordance with the teachings of this disclosure. Example distributed trailing edge wing flap systems disclosed herein may be implemented in commercial aircraft (e.g., the aircraft 100 of FIG. 1) as well as other types of aircraft (e.g., military aircraft, unmanned aerial vehicles, etc.). The aircraft 100 of FIG. 1 includes an example first wing 102, an example second wing 104, an example fuselage 106, and an example cockpit area 108. The first wing 102 includes an example first fixed trailing edge 110, an example first inboard flap 112, and an example first outboard flap 114. The first inboard flap 112 and the first outboard flap 114 are respectively located at and/or along the first fixed trailing edge 110 of the first wing 102. The second wing 104 includes an example second fixed trailing edge 116, an example second inboard flap 118, and an example second outboard flap 120. The second inboard flap 118 and the second outboard flap 120 are respectively located at and/or along the second fixed trailing edge 116 of the second wing 104.

In the illustrated example of FIG. 1, the first inboard flap 112 and the first outboard flap 114 are shown in respective retracted positions relative to the first fixed trailing edge 110 of the first wing 102, and the second inboard flap 118 and the second outboard flap 120 are shown in respective retracted positions relative to the second fixed trailing edge 116 of the second wing 104. The first inboard flap 112 and the first outboard flap 114 are movable and/or actuatable between the respective retracted positions shown in FIG. 1 and respective deployed positions in which the first inboard flap 112 and the first outboard flap 114 are extended rearward and/or downward from the first fixed trailing edge 110 of the first wing 102. The second inboard flap 118 and the second outboard flap 120 are similarly movable and/or actuatable between the respective retracted positions shown in FIG. 1 and respective deployed positions in which the second inboard flap 118 and the second outboard flap 120 are extended rearward and/or downward from the second fixed trailing edge 116 of the second wing 104. In some examples, respective ones of the wing flaps (e.g., the first inboard flap 112, the first outboard flap 114, the second inboard flap 118, and/or the second outboard flap 120) may be movable and/or actuatable to a variety of deployed positions corresponding to desired and/or commanded detents of the flaps (e.g., flaps thirty (F30), flaps forty (F40), etc.).

Figure 2A:
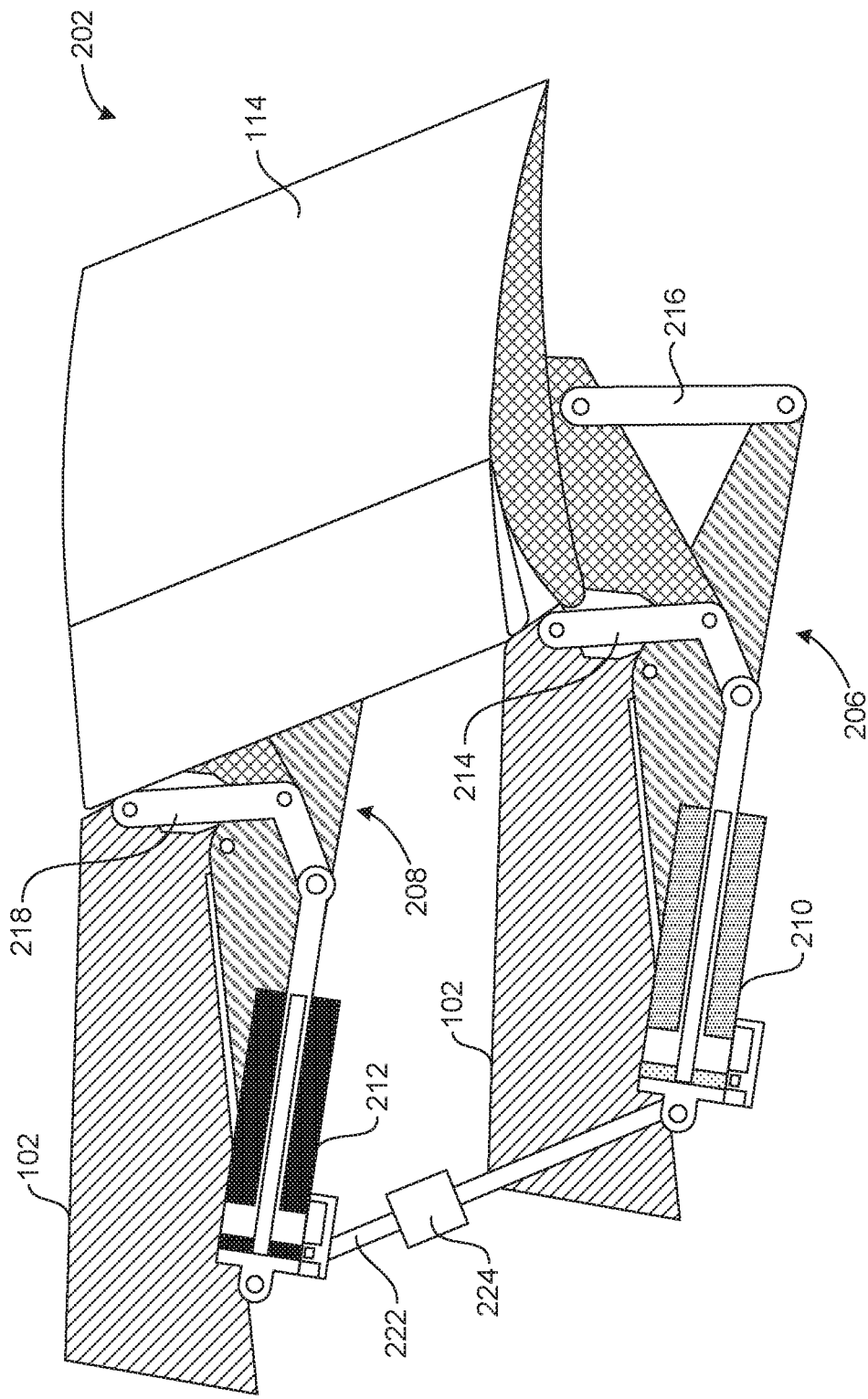
FIG. 2A is a perspective view of the example first outboard flap of the example first wing of FIG. 1 in an example retracted position.
Figure 2B:
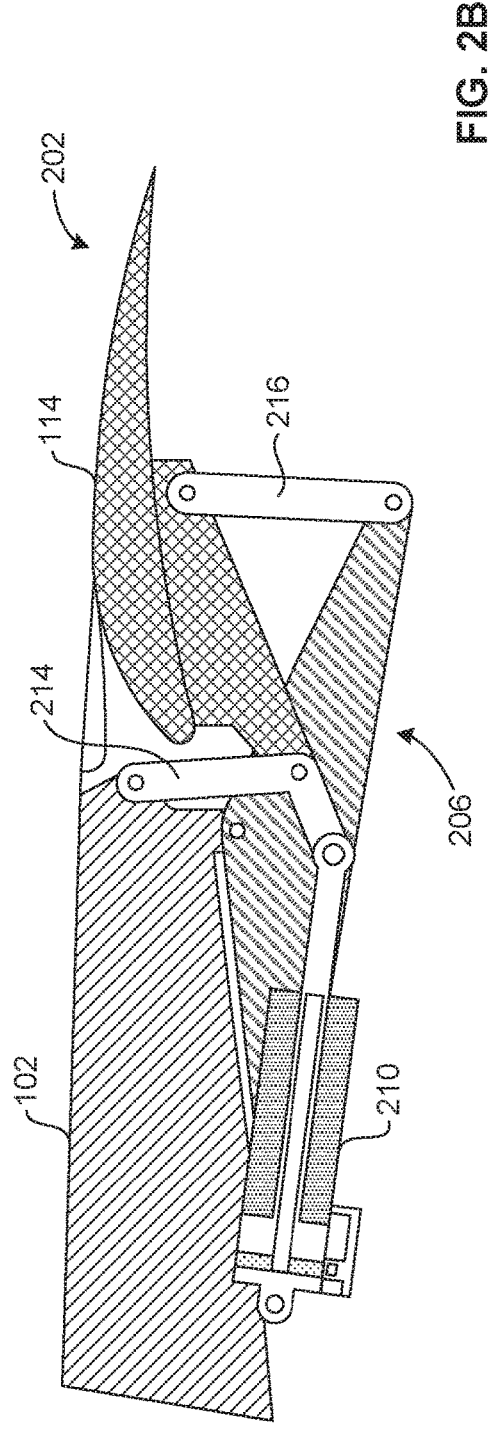
FIG. 2B is a first cross-sectional view of the example first outboard flap of the example first wing of FIG. 1 in the example retracted position of FIG. 2A.
Figure 2C:
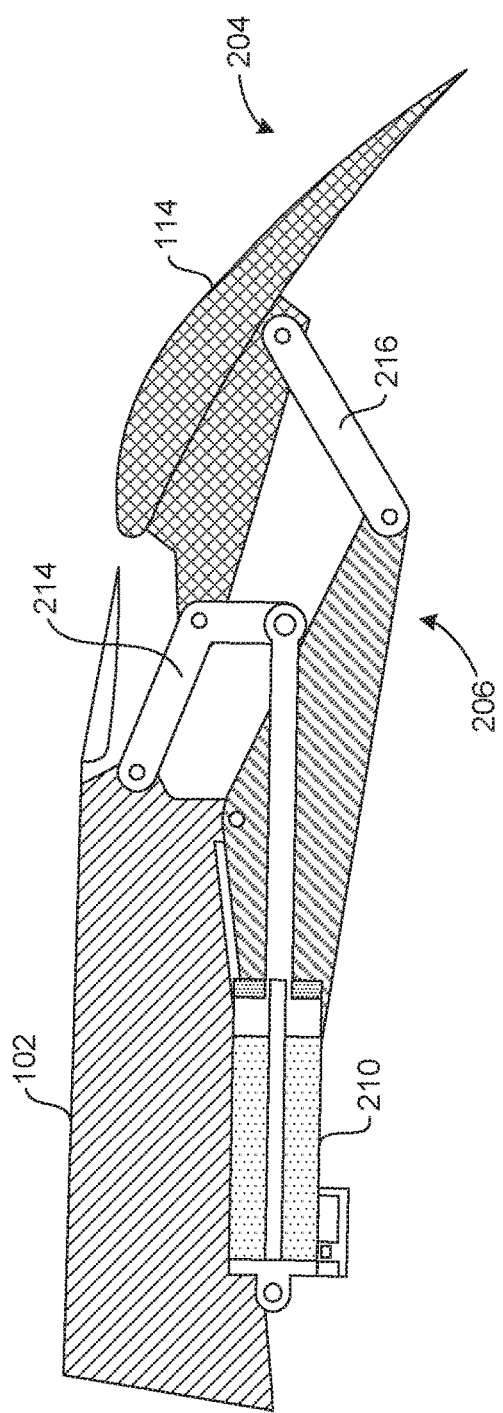
FIG. 2C is a first cross-sectional view of the example first outboard flap of the example first wing of FIG. 1 in an example deployed position.
Figure 2D:
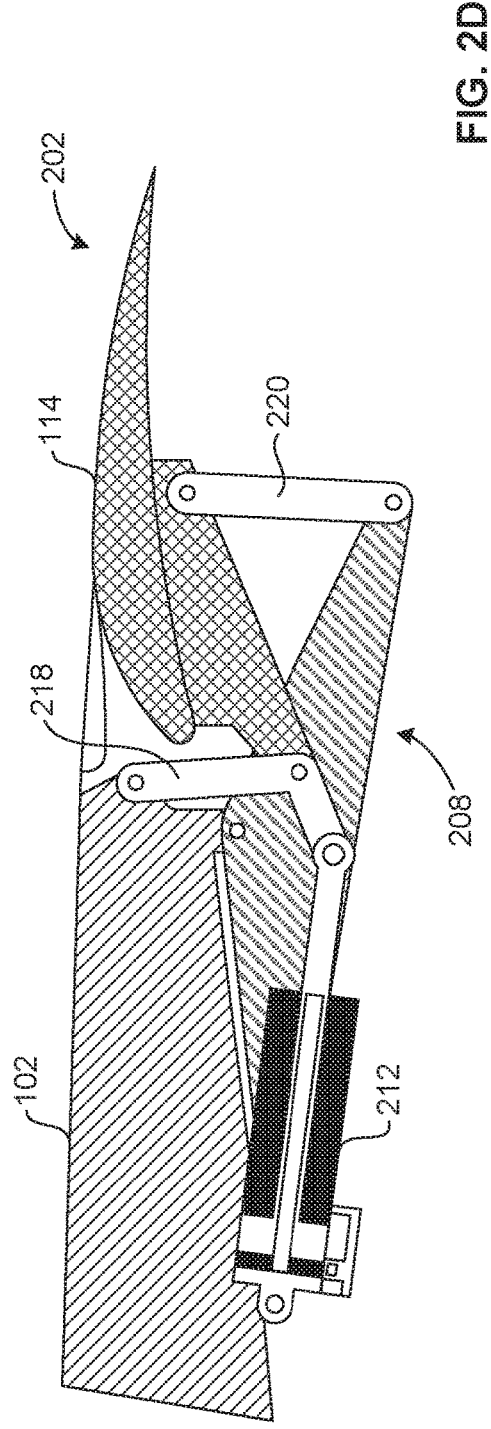
FIG. 2D is a second cross-sectional view of the example first outboard flap of the example first wing of FIG. 1 in the example retracted position of FIGS. 2A and 2B.
Figure 2E:
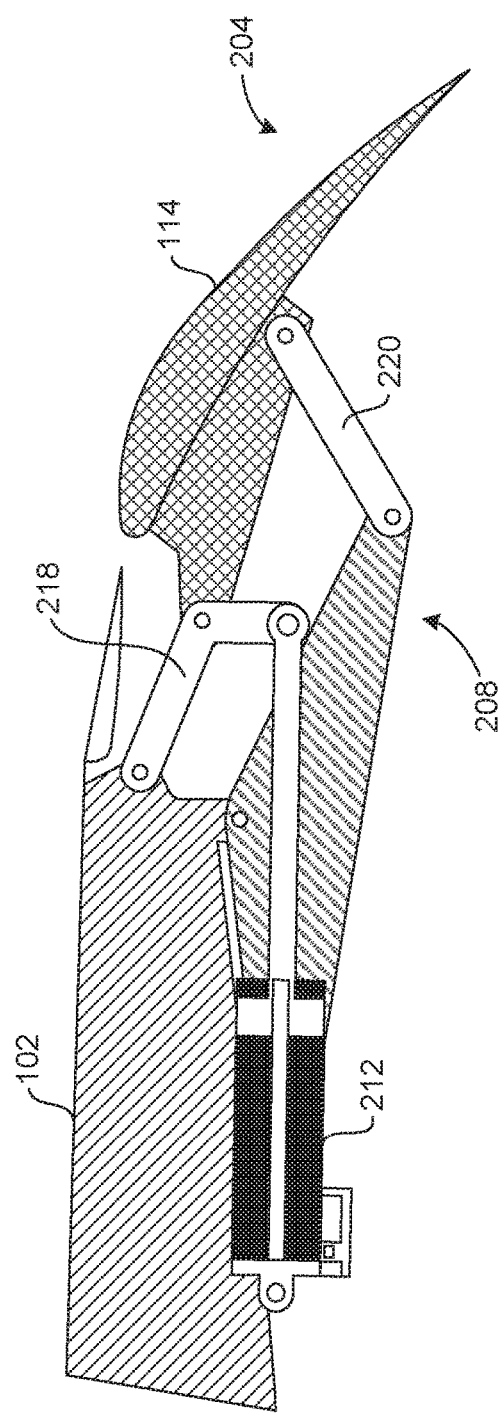
FIG. 2E is a second cross-sectional view of the example first outboard flap of the example first wing of FIG. 1 in the example deployed position of FIG. 2C.

In some examples, respective ones of the wing flaps (e.g., the first inboard flap 112, the first outboard flap 114, the second inboard flap 118, and/or the second outboard flap 120) may be movable and/or actuatable between a retracted position and a deployed position via one or more actuator(s) (e.g., one or more hydromechanical actuator(s), one or more electromechanical actuator(s), etc.). FIG. 2A is a perspective view of the example first outboard flap 114 of the example first wing 102 of FIG. 1 in an example retracted position 202. FIG. 2B is a first cross-sectional view of the example first outboard flap 114 of the example first wing 102 of FIG. 1 in the example retracted position 202 of FIG. 2A. FIG. 2C is a first cross-sectional view of the example first outboard flap 114 of the example first wing 102 of FIG. 1 in an example deployed position 204. The cross-sectional views of FIGS. 2B and 2C are taken at the hydromechanical actuator of FIG. 2A. FIG. 2D is a second cross-sectional view of the example first outboard flap 114 of the example first wing 102 of FIG. 1 in the example retracted position 202 of FIGS. 2A and 2B. FIG. 2E is a second cross-sectional view of the example first outboard flap 114 of the example first wing 102 of FIG. 1 in the example deployed position 204 of FIG. 2C. The cross-sectional views of FIGS. 2D and 2E are taken at the electromechanical actuator of FIG. 2A.

In the illustrated examples of FIGS. 2A-2E, the first outboard flap 114 is coupled to the first wing 102 via a first example linkage assembly 206 and a second example linkage assembly 208. The first outboard flap 114 is movable and/or actuatable between the retracted position 202 of FIGS. 2A, 2B and 2D and the deployed position 204 of FIGS. 2C and 2E via an example hydromechanical actuator (HMA) 210 coupled to the first linkage assembly 206 and to the first wing 102, and via an example electromechanical actuator (EMA) 212 coupled to the second linkage assembly 208 and to the first wing 102.

The first linkage assembly 206 of FIGS. 2A-2C includes an example first link 214 and an example second link 216. In the illustrated example of FIGS. 2A-2C, the first link 214 of the first linkage assembly 206 extends from the HMA 210 to the first outboard flap 114, and also extends to the first wing 102. The second link 216 of the first linkage assembly 206 extends from the first wing 102 to the first outboard flap 114. In other examples, the configuration of the first link 214 and/or the second link 216 of the first linkage assembly 206 may differ from that shown in FIGS. 2A-2C. In still other examples, the first linkage assembly 206 of FIGS. 2A-2C may include additional (e.g., a third, a fourth, a fifth, a sixth, etc.) links beyond the first and second links 214, 216 described above.

In the illustrated examples of FIGS. 2A-2C, the HMA 210 may be powered, controlled, and/or operated via a hydraulic module operatively coupled to the HMA 210 and located within the first wing 102 of the aircraft 100. The hydraulic module may be powered, controlled, and/or operated via a remote electronics unit (REU) operatively coupled to the hydraulic module and located within the first wing 102 of the aircraft 100. The REU may be powered, controlled, and/or operated via one or more flight control electronics unit(s) (FCEU) operatively coupled to the REU and located within the fuselage 106 of the aircraft 100. The one or more FCEU(s) may be controlled and/or operated based on one or more input(s) received from a flap lever and/or a pilot control inceptor operatively coupled to the FCEU(s) and located in the cockpit area 108 of the aircraft 100.

The second linkage assembly 208 of FIGS. 2A, 2D and 2E includes an example first link 218 and an example second link 220. In the illustrated example of FIGS. 2A, 2D and 2E, the first link 218 of the second linkage assembly 208 extends from the EMA 212 to the first outboard flap 114, and also extends to the first wing 102. The second link 220 of the second linkage assembly 208 extends from the first wing 102 to the first outboard flap 114. In other examples, the configuration of the first link 218 and/or the second link 220 of the second linkage assembly 208 may differ from that shown in FIGS. 2A, 2D and 2E. In still other examples, the second linkage assembly 208 of FIGS. 2A, 2D and 2E may include additional (e.g., a third, a fourth, a fifth, a sixth, etc.) links beyond the first and second links 218, 220 described above.

In the illustrated examples of FIGS. 2A, 2D and 2E, the EMA 212 may be powered, controlled, and/or operated via an electric motor operatively coupled to the EMA 212 and located within the first wing 102 of the aircraft 100. The electric motor may be powered, controlled, and/or operated via an electronic motor control unit (EMCU) operatively coupled to the electric motor and located within the first wing 102 of the aircraft 100. The EMCU may be powered, controlled, and/or operated via one or more flight control electronics unit(s) (FCEU) operatively coupled to the EMCU and located within the fuselage 106 of the aircraft 100. The one or more FCEU(s) may be controlled and/or operated based on one or more input(s) received from a flap lever and/or a pilot control inceptor operatively coupled to the FCEU(s) and located in the cockpit area 108 of the aircraft 100.

As shown in FIG. 2A, the HMA 210 of FIGS. 2A-2C is operatively coupled (e.g., in mechanical communication with) the EMA 212 of FIGS. 2A, 2D and 2E via an example shaft 222. In the illustrated example of FIG. 2A, the shaft 222 is a flexible shaft that transfers rotational motion from a gear train of the HMA 210 to a gear train of the EMA 212, and vice-versa. For example, as further described below in connection with FIGS. 4, 5, 8 and 9, the shaft 222 may transfer rotational motion from a gear train of the HMA 210 to a gear train of the EMA 212 in response to a load applied to the shaft 222. In some examples, rotation of the shaft 222 may be selectively controlled via an example alternate control unit (ACU) 224 mounted on the shaft 222. In some such examples, the ACU 224 may be activated to control rotation of the shaft 222 in response to the one or more FCEU(s) described above detecting an asymmetry between a first wing flap (e.g., the first outboard flap 114 of FIG. 1) and a second wing flap (e.g., the second outboard flap 120 of FIG. 1).

Figure 3:
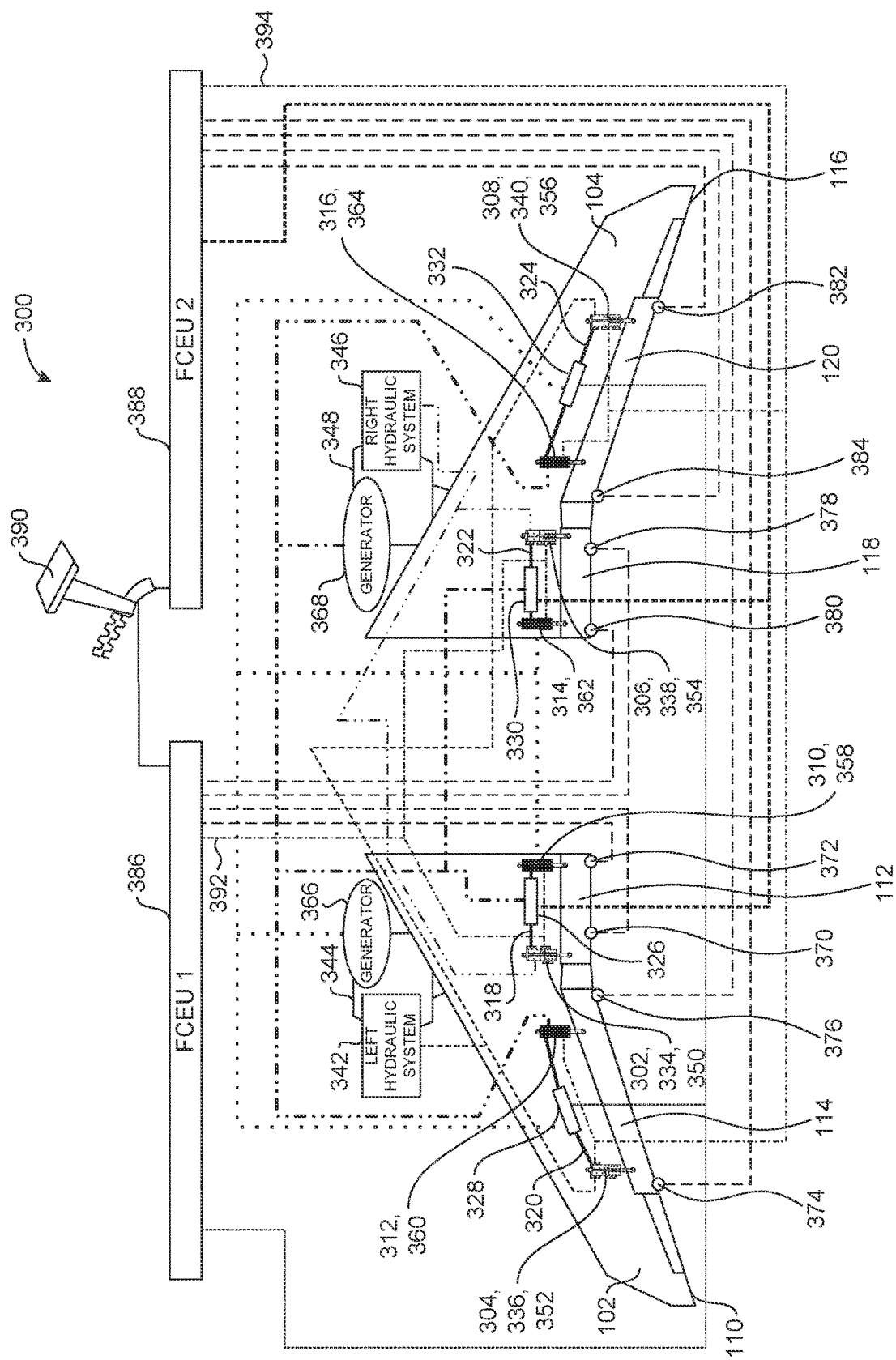
FIG. 3 is a schematic of an example distributed trailing edge wing flap system constructed in accordance with the teachings of this disclosure.

FIG. 3 is a schematic of an example distributed trailing edge wing flap system 300 constructed in accordance with the teachings of this disclosure. The distributed trailing edge wing flap system 300 of FIG. 3 may be implemented in the example aircraft 100 of FIG. 1 described above. In the illustrated example of FIG. 3, the distributed trailing edge wing flap system includes the first wing 102, the second wing 104, the first fixed trailing edge 110, the first inboard flap 112, the first outboard flap 114, the second fixed trailing edge 116, the second inboard flap 118, and the second outboard flap 120 of FIG. 1 described above.

The distributed trailing edge wing flap system 300 of FIG. 3 also includes a first example HMA 302, a second example HMA 304, a third example HMA 306, a fourth example HMA 308, a first example EMA 310, a second example EMA 312, a third example EMA 314, and a fourth example EMA 316. In the illustrated example of FIG. 3, the first HMA 302 and the first EMA 310 are respectively coupled to the first inboard flap 112 and to the first wing 102. The second HMA 304 and the second EMA 312 are respectively coupled to the first outboard flap 114 and to the first wing 102. The third HMA 306 and the third EMA 314 are respectively coupled to the second inboard flap 118 and to the second wing 104. The fourth HMA 308 and the fourth EMA 316 are respectively coupled to the second outboard flap 120 and to the second wing 104. An example HMA that may be used to implement respective ones of the first, second, third and fourth HMAs 302, 304, 306, 308 of FIG. 3 is further described below in connection with FIGS. 4-7. An example EMA that may be used to implement respective ones of the first, second, third and fourth EMAs 310, 312, 314, 316 of FIG. 3 is further described below in connection with FIGS. 4 and 8.

The first, second, third and fourth HMAs 302, 304, 306, 308 and the first, second, third and fourth EMAs 310, 312, 314, 316 respectively move and/or actuate correspondingly coupled ones of the first inboard flap 112, the first outboard flap 114, the second inboard flap 118, and the second outboard flap 120 between respective retracted positions and respective deployed positions. For example, in the illustrated example of FIG. 3, the first HMA 302 and the first EMA 310 move and/or actuate the first inboard flap 112 between a retracted position (as shown in FIG. 3) and a deployed position relative the first fixed trailing edge 110 of the first wing 102. The second HMA 304 and the second EMA 312 move and/or actuate the first outboard flap 114 between a retracted position (as shown in FIG. 3) and a deployed position relative the first fixed trailing edge 110 of the first wing 102. The third HMA 306 and the third EMA 314 move and/or actuate the second inboard flap 118 between a retracted position (as shown in FIG. 3) and a deployed position relative the second fixed trailing edge 116 of the second wing 104. The fourth HMA 308 and the fourth EMA 316 move and/or actuate the second outboard flap 120 between a retracted position (as shown in FIG. 3) and a deployed position relative the second fixed trailing edge 116 of the second wing 104.

Although not visible in FIG. 3, respective ones of the first, second, third and fourth HMAs 302, 304, 306, 308 and respective ones of the first, second, third and fourth EMAs 310, 312, 314, 316 include an actuator position feedback sensor to sense, measure and/or detect a position of the HMA or EMA. In some examples, the position of the HMA or EMA sensed, measured and/or detected via the actuator position feedback sensor may correspond to and/or indicate a position (e.g., a retracted position, a deployed position, etc.) of the corresponding wing flap to which the HMA or EMA is coupled. An actuator position feedback sensor that may be included in and/or implemented by respective ones of the first, second, third and fourth HMAs 302, 304, 306, 308 of FIG. 3 is further described below in connection with FIG. 5. An actuator position feedback sensor that may be included in and/or implemented by respective ones of the first, second, third and fourth EMAs 310, 312, 314, 316 of FIG. 3 is further described below in connection with FIG. 8.

The distributed trailing edge wing flap system 300 of FIG. 3 also includes a first example shaft 318, a second example shaft 320, a third example shaft 322, and a fourth example shaft 324. Respective ones of the first, second, third and fourth shafts 318, 320, 322, 324 operatively couple (e.g., mechanically couple) corresponding respective ones of the first, second, third and fourth HMAs 302, 304, 306, 308 to corresponding respective ones of the first, second, third and fourth EMAs 310, 312, 314, 316. For example, in the illustrated example of FIG. 3, the first shaft 318 operatively couples the first HMA 302 to the first EMA 310 such that motion and/or movement of the first HMA 302 is transferred via the first shaft 318 to the first EMA 310, or vice-versa. The second shaft 320 operatively couples the second HMA 304 to the second EMA 312 such that motion and/or movement of the second HMA 304 is transferred via the second shaft 320 to the second EMA 312, or vice-versa. The third shaft 322 operatively couples the third HMA 306 to the third EMA 314 such that motion and/or movement of the third HMA 306 is transferred via the third shaft 322 to the third EMA 314, or vice-versa. The fourth shaft 324 operatively couples the fourth HMA 308 to the fourth EMA 316 such that motion and/or movement of the fourth HMA 308 is transferred via the fourth shaft 324 to the fourth EMA 316, or vice-versa. An example shaft that may be used to implement respective ones of the first, second, third and fourth shafts 318, 320, 322, 324 of FIG. 3 is further described below in connection with FIGS. 4, 5, 8 and 9.

The distributed trailing edge wing flap system 300 of FIG. 3 also includes a first example ACU 326, a second example ACU 328, a third example ACU 330, and a fourth example ACU 332. Respective ones of the first, second, third and fourth ACUs 326, 328, 330, 332 are mounted on, and selectively control the rotation of, corresponding respective ones of the first, second, third and fourth shafts 318, 320, 322, 324. For example, in the illustrated example of FIG. 3, the first ACU 326 is mounted on and selectively controls the rotation of the first shaft 318. The second ACU 328 is mounted on and selectively controls the rotation of the second shaft 320. The third ACU 330 is mounted on and selectively controls the rotation of the third shaft 322. The fourth ACU 332 is mounted on and selectively controls the rotation of the fourth shaft 324.

Although not visible in FIG. 3, the first ACU 326 includes a first switch, the second ACU 328 includes a second switch, the third ACU 330 includes a third switch, and the fourth ACU 332 includes a fourth switch. In some examples, one or more of the first, second, third and fourth ACUs 326, 328, 330, 332 may be activated via a corresponding respective one or more of the first, second, third and fourth switches to control rotation of a corresponding respective one or more of the first, second, third and fourth shafts 318, 320, 322, 324 in response to one or more FCEU(s) (further described below) detecting an asymmetry between a first wing flap (e.g., the first inboard flap 112 of FIG. 1) and a second wing flap (e.g., the second inboard flap 118 of FIG. 1). An example ACU that may be used to implement respective ones of the first, second, third and fourth ACUs 326, 328, 330, 332 of FIG. 3 is further described below in connection with FIGS. 4 and 9.

The distributed trailing edge wing flap system 300 of FIG. 3 also includes a first example hydraulic module 334, a second example hydraulic module 336, a third example hydraulic module 338, and a fourth example hydraulic module 340. In some examples, the first and second hydraulic modules 334, 336 are located within the first wing 102, and the third and fourth hydraulic modules 338, 340 are located within the second wing 104. In the illustrated example of FIG. 3, the first hydraulic module 334 is located at and is operatively coupled to (e.g., in fluid communication with) the first HMA 302, the second hydraulic module 336 is located at and is operatively coupled to the second HMA 304, the third hydraulic module 338 is located at and is operatively coupled to the third HMA 306, and the fourth hydraulic module 340 is located at and is operatively coupled to the fourth HMA 308.

The distributed trailing edge wing flap system 300 of FIG. 3 also includes a first example hydraulic system 342 powered by a first example engine 344, and a second example hydraulic system 346 powered by a second example engine 348. In the illustrated example of FIG. 3, the first engine 344 is coupled to the first wing 102, and the second engine 348 is coupled to the second wing 104. The first engine 344 powers the first hydraulic system 342 to supply pressurized hydraulic fluid to respective ones of the second and fourth hydraulic modules 336, 340. The second engine 348 powers the second hydraulic system 346 to supply pressurized hydraulic fluid to respective ones of the first and third hydraulic modules 334, 338.

Pressurized hydraulic fluid supplied via the first hydraulic system 342 of FIG. 3 to respective ones of the second and fourth hydraulic modules 336, 340 may be delivered to corresponding respective ones of the second and fourth HMAs 304, 308 to move and/or actuate the second and fourth HMAs 304, 308. Pressurized hydraulic fluid contained within respective ones of the second and fourth HMAs 304, 308 may be returned to the first hydraulic system 342 via corresponding respective ones of the second and fourth hydraulic modules 336, 340. Pressurized hydraulic fluid supplied via the second hydraulic system 346 of FIG. 3 to respective ones of the first and third hydraulic modules 334, 338 may be delivered to corresponding respective ones of the first and third HMAs 302, 306 to move and/or actuate the first and third HMAs 302, 306. Pressurized hydraulic fluid contained within respective ones of the first and third HMAs 302, 306 may be returned to the second hydraulic system 346 via corresponding respective ones of the first and third hydraulic modules 334, 338.

The distributed trailing edge wing flap system 300 of FIG. 3 also includes a first example REU 350, a second example REU 352, a third example third REU 354, and a fourth example REU 356. In some examples, the first and second REUs 350, 352 are located within the first wing 102, and the third and fourth REUs 354, 356 are located within the second wing 104. In the illustrated example of FIG. 3, the first REU 350 is located at and is operatively coupled to (e.g., in electrical communication with) the first hydraulic module 334, the second REU 352 is located at and is operatively coupled to the second hydraulic module 336, the third REU 354 is located at and is operatively coupled to the third hydraulic module 338, and the fourth REU 356 is located at and is operatively coupled to the fourth hydraulic module 340. Respective ones of the first, second, third and fourth REUs 350, 352, 354, 356 control corresponding respective ones of the first, second, third and fourth hydraulic modules 334, 336, 338, 340, as further described below in connection with FIGS. 4-7.

In some examples, the first REU 350 is further operatively coupled to (e.g., in electrical communication with) the actuator position feedback sensor of the first HMA 302, the second REU 352 is further operatively coupled to the actuator position feedback sensor of the second HMA 304, the third REU 354 is further operatively coupled to the actuator position feedback sensor of the third HMA 306, and the fourth REU 356 is further operatively coupled to the actuator position feedback sensor of the fourth HMA 308. In such examples, respective ones of the first, second, third and fourth REUs 350, 352, 354, 356 may control corresponding respective ones of the first, second, third and fourth hydraulic modules 334, 336, 338, 340 based on actuator position feedback data obtained by respective ones of the first, second, third and fourth REUs 350, 352, 354, 356 from corresponding respective ones of the first, second, third and fourth actuator position feedback sensors of corresponding respective ones of the first, second, third and fourth HMAs 302, 304, 306, 308, as further described below in connection with FIGS. 4-7.

The distributed trailing edge wing flap system 300 of FIG. 3 also includes a first example EMCU 358, a second example EMCU 360, a third example EMCU 362, and a fourth example EMCU 364. In some examples, the first and second EMCUs 358, 360 are located within the first wing 102, and the third and fourth EMCUs 362, 364 are located within the second wing 104. In the illustrated example of FIG. 3, the first EMCU 358 is located at and is operatively coupled to (e.g., in electrical communication with) the first EMA 310, the second EMCU 360 is located at and is operatively coupled to the second EMA 312, the third EMCU 362 is located at and is operatively coupled to the third EMA 314, and the fourth EMCU 364 is located at and is operatively coupled to the fourth EMA 316. Respective ones of the first, second, third and fourth EMCUs 358, 360, 362, 364 control corresponding respective ones of first, second, third and fourth electric motors of corresponding respective ones of the first, second, third and fourth EMAs 310, 312, 314, 316, as further described below in connection with FIGS. 4 and 8.

In some examples, the first EMCU 358 is further operatively coupled to (e.g., in electrical communication with) the actuator position feedback sensor of the first EMA 310, the second EMCU 360 is further operatively coupled to the actuator position feedback sensor of the second EMA 312, the third EMCU 362 is further operatively coupled to the actuator position feedback sensor of the third EMA 314, and the fourth EMCU 364 is further operatively coupled to the actuator position feedback sensor of the fourth EMA 316. In such examples, respective ones of the first, second, third and fourth EMCUs 358, 360, 362, 364 may control corresponding respective ones of first, second, third and fourth electric motors of corresponding respective ones of the first, second, third and fourth EMAs 310, 312, 314, 316 based on actuator position feedback data obtained by respective ones of the first, second, third and fourth EMCUs 358, 360, 362, 364 from corresponding respective ones of the first, second, third and fourth actuator position feedback sensors of corresponding respective ones of the first, second, third and fourth EMAs 310, 312, 314, 316, as further described below in connection with FIGS. 4 and 8.

The distributed trailing edge wing flap system 300 of FIG. 3 also includes a first example electrical system and/or generator 366 powered by the first engine 344, and a second example electrical system and/or generator 368 powered by the second engine 348. In the illustrated example of FIG. 3, the first engine 344 is coupled to the first wing 102, and the second engine 348 is coupled to the second wing 104. The first engine 344 powers the first generator 366 to supply electrical power to first and third electric motors of corresponding respective ones of the first and third EMAs 310, 314. The first engine 344 also powers the first generator 366 to supply electrical power to the second and fourth ACUs 328, 332. The second engine 348 powers the second generator 368 to supply electrical power to second and fourth electric motors of corresponding respective ones of the second and fourth EMAs 312, 316. The second engine 348 also powers the second generator 368 to supply electrical power to the first and third ACUs 326, 330.

The distributed trailing edge wing flap system 300 of FIG. 3 also includes a first example flap position sensor 370, a second example flap position sensor 372, a third example flap position sensor 374, a fourth example flap position sensor 376, a fifth example flap position sensor 378, a sixth example flap position sensor 380, a seventh example flap position sensor 382, and an eighth example flap position sensor 384. In the illustrated example of FIG. 3, the first flap position sensor 370 and the second flap position sensor 372 are respectively coupled to the first inboard flap 112 of the first wing 102. The third flap position sensor 374 and the fourth flap position sensor 376 are respectively coupled to the first outboard flap 114 of the first wing 102. The fifth flap position sensor 378 and the sixth flap position sensor 380 are respectively coupled to the second inboard flap 118 of the second wing 104. The seventh flap position sensor 382 and the eighth flap position sensor 384 are respectively coupled to the second outboard flap 120 of the second wing 104. Respective ones of the first, second, third, fourth, fifth, sixth, seventh and eighth flap position sensors 370, 372, 374, 376, 378, 380, 382, 384 sense, measure and/or detect a position of a correspondingly coupled one of the first inboard flap 112, the first outboard flap 114, the second inboard flap 118, and the second outboard flap 120. For example, the first flap position sensor 370 and the second flap position sensor 372 may respectively sense, measure and/or detect a position of the first inboard flap 112 of the first wing 102 relative to the first fixed trailing edge 110 of the first wing 102.

The distributed trailing edge wing flap system 300 of FIG. 3 also includes a first example FCEU 386, a second example FCEU 388, and an example flap lever 390. In some examples, the first FCEU 386 and the second FCEU 388 of FIG. 3 may be located within a fuselage of an aircraft (e.g., the fuselage 106 of the aircraft 100 of FIG. 1), and the flap lever 390 of FIG. 3 may be located in a cockpit area of the aircraft (e.g., the cockpit area 108 of the aircraft 100 of FIG. 1). The first FCEU 386 and the second FCEU 388 of FIG. 3 are respectively controlled and/or operated based on one or more input(s) received from the flap lever 390 of FIG. 3. In some examples, the position of the flap lever 390 may correspond to and/or otherwise be associated with a desired and/or commanded position and/or detent (e.g., flaps retracted, flaps thirty (F30), flaps forty (F40), etc.) of the first inboard flap 112, the first outboard flap 114, the second inboard flap 118, and/or the second outboard flap 120.

In the illustrated example of FIG. 3, the first FCEU 386 is operatively coupled to (e.g., in electrical communication with) respective ones of the first and third REUs 350, 354 and respective ones of the first and third EMCUs 358, 362 via a first example databus 392. The first FCEU 386 may transmit and/or receive data (e.g., REU control data, EMCU control data, hydraulic module control data, electric motor control data, actuator position feedback sensor data, etc.) to and/from respective ones of the first and third REUs 350, 354 and/or respective ones of the first and third EMCUs 358, 362 via the first databus 392. The first FCEU 386 is also operatively coupled to (e.g., in electrical communication with) respective ones of the first, second, fifth and sixth flap position sensors 370, 372, 378, 380. The first FCEU 386 may receive data (e.g., flap position sensor data) from respective ones of the first, second, fifth and sixth flap position sensors 370, 372, 378, 380.

The second FCEU 388 is operatively coupled to (e.g., in electrical communication with) respective ones of the second and fourth REUs 352, 356 and respective ones of the second and fourth EMCUs 360, 364 via a second example databus 394. The second FCEU 388 may transmit and/or receive data (e.g., REU control data, EMCU control data, hydraulic module control data, electric motor control data, actuator position feedback sensor data, etc.) to and/from respective ones of the second and fourth REUs 352, 356 and/or respective ones of the second and fourth EMCUs 360, 364 via the second databus 394. The second FCEU 388 is also operatively coupled to (e.g., in electrical communication with) respective ones of the third, fourth, seventh and eighth flap position sensors 374, 376, 382, 384. The second FCEU 388 may receive data (e.g., flap position sensor data) from respective ones of the third, fourth, seventh and eighth flap position sensors 374, 376, 382, 384.

In the illustrated example of FIG. 3, the first FCEU 386 controls the second and fourth switches of the second and fourth ACUs 328, 332 to selectively activate the second and fourth ACUs 328, 332. In some examples, the second and fourth switches of the second and fourth ACUs 328, 332 may be actuated to a closed position following and/or in response to a failure of the first hydraulic system 342, and/or a failure of the second hydraulic system 346 of FIG. 3. In response to the first FCEU 386 actuating the second and fourth switches of the second and fourth ACUs 328, 332 to the closed position, corresponding respective ones of the second and fourth ACUs 328, 332 are activated. Activation of the second and fourth ACUs 328, 332 causes the second and fourth ACUs 328, 332 to control rotation of corresponding respective ones of the second and fourth shafts 320, 324. Rotation of the second and fourth shafts 320, 324 via the second and fourth ACUs 328, 332 moves and/or actuates the second HMA 304, the second EMA 312, the fourth HMA 308 and/or the fourth EMA 316, thereby moving and/or actuating corresponding respective ones of the first outboard flap 114 and the second outboard flap 120 to a predetermined position (e.g., flaps thirty (F30), flaps forty (F40), etc.).

In the illustrated example of FIG. 3, the second FCEU 388 controls the first and third switches of the first and third ACUs 326, 330 to selectively activate the first and third ACUs 326, 330. In some examples, the first and third switches of the first and third ACUs 326, 330 may be actuated to a closed position following and/or in response to a failure of the first hydraulic system 342, and/or a failure of the second hydraulic system 346 of FIG. 3. In response to the second FCEU 388 actuating the first and third switches of the first and third ACUs 326, 330 to the closed position, corresponding respective ones of the first and third ACUs 326, 330 are activated. Activation of the first and third ACUs 326, 330 causes the first and third ACUs 326, 330 to control rotation of corresponding respective ones of the first and third shafts 318, 322. Rotation of the first and third shafts 318, 322 via the first and third ACUs 326, 330 moves and/or actuates the first HMA 302, the first EMA 310, the third HMA 306 and/or the third EMA 314, thereby moving and/or actuating corresponding respective ones of the first inboard flap 112 and the second inboard flap 118 to a predetermined position (e.g., flaps thirty (F30), flaps forty (F40), etc.).

Figure 4:
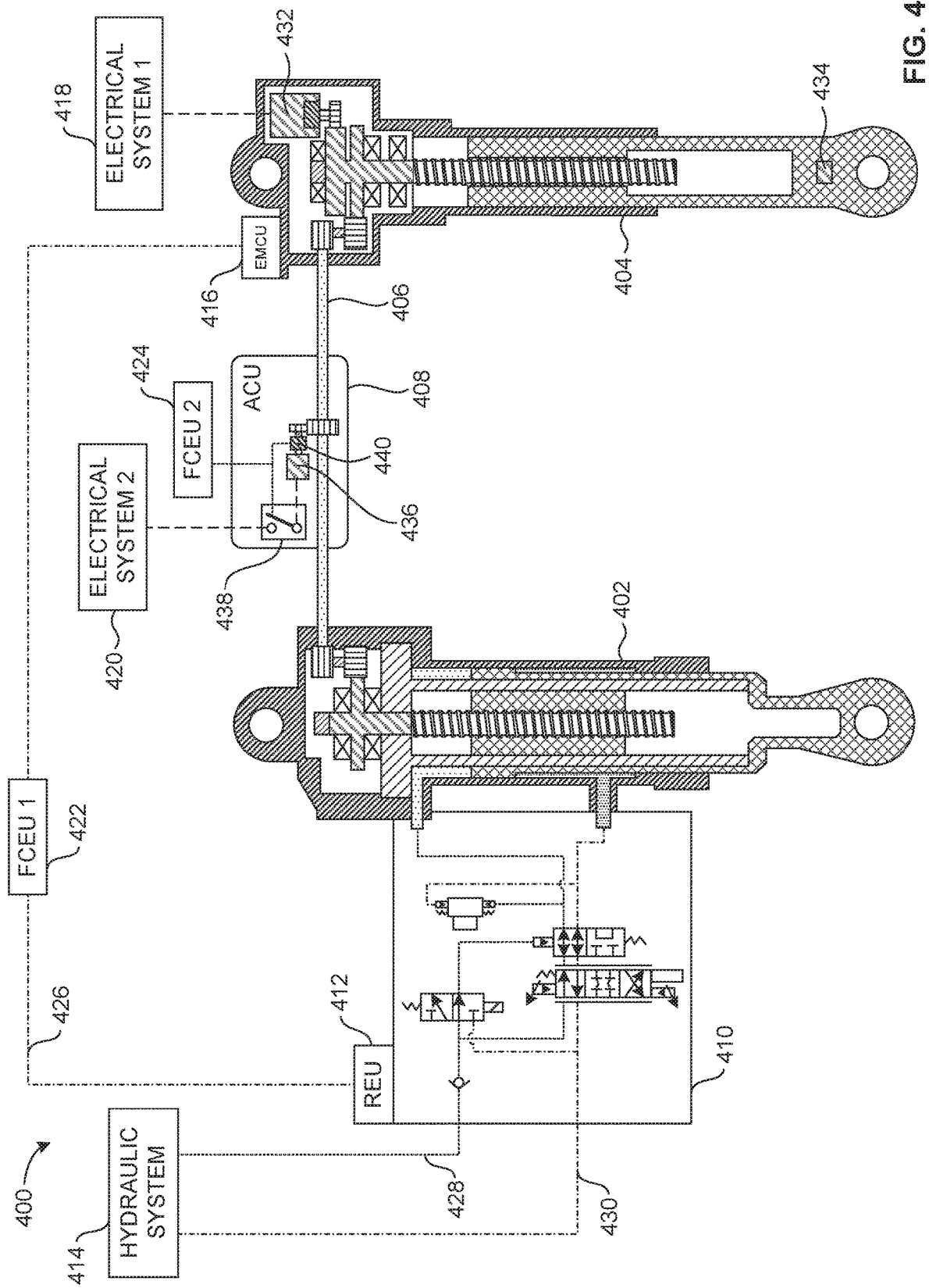
FIG. 4 is a schematic of an example subsystem of the example distributed trailing edge wing flap system of FIG. 3.

FIG. 4 is a schematic of an example subsystem 400 of the example distributed trailing edge wing flap system 300 of FIG. 3. The subsystem 400 of FIG. 4 includes an example HMA 402, an example EMA 404, an example shaft 406, an example ACU 408, an example hydraulic module 410, an example REU 412, an example hydraulic system 414, an example EMCU 416, a first example electrical system 418, a second example electrical system 420, a first example FCEU 422, a second example FCEU 424, and an example databus 426. The subsystem 400 of FIG. 4 is representative of the structures and operative couplings associated with any one of the first inboard flap 112, the first outboard flap 114, the second inboard flap 118, or the second outboard flap 120 of FIG. 3 described above.

For example, the HMA 402, the EMA 404, the shaft 406, the ACU 408, the hydraulic module 410, the REU 412, the hydraulic system 414, the EMCU 416, the first electrical system 418, the second electrical system 420, the first FCEU 422, the second FCEU 424, and the databus 426 of FIG. 4 may correspond, respectively, to the first HMA 302, the first EMA 310, the first shaft 318, the first ACU 326, the first hydraulic module 334, the first REU 350, the second hydraulic system 346, the first EMCU 358, the first electrical system (e.g., the first generator) 366, the second electrical system (e.g., the second generator) 368, the first FCEU 386, the second FCEU 388, and the first databus 392 of FIG. 3 associated with the first inboard flap 112 of FIG. 3. As another example, the HMA 402, the EMA 404, the shaft 406, the ACU 408, the hydraulic module 410, the REU 412, the hydraulic system 414, the EMCU 416, the first electrical system 418, the second electrical system 420, the first FCEU 422, the second FCEU 424, and the databus 426 of FIG. 4 may correspond, respectively, to the second HMA 304, the second EMA 312, the second shaft 320, the second ACU 328, the second hydraulic module 336, the second REU 352, the first hydraulic system 342, the second EMCU 360, the second electrical system (e.g., the second generator) 368, the first electrical system (e.g., the first generator) 366, the second FCEU 388, the first FCEU 386, and the second databus 394 of FIG. 3 associated with the first outboard flap 114 of FIG. 3.

In the illustrated example of FIG. 4, the shaft 406 operatively couples (e.g., mechanically couples) the HMA 402 to the EMA 404 such that motion and/or movement of the HMA 402 is transferred via the shaft 406 to the EMA 404, and vice-versa. The ACU 408 of FIG. 4 is mounted on, and selectively controls the rotation of, the shaft 406. The hydraulic module 410 of FIG. 4 is located at, and is operatively coupled to (e.g., in fluid communication with), the HMA 402. The REU 412 of FIG. 4 is located at, and is operatively coupled to (e.g., in electrical communication with), the hydraulic module 410 and/or the HMA 402. The hydraulic system 414 of FIG. 4 is operatively coupled to (e.g., in fluid communication with) the hydraulic module 410 via an example supply line 428 and an example return line 430. The EMCU 416 of FIG. 4 is located at, and is operatively coupled to (e.g., in electrical communication with), the EMA 404 and/or an example electric motor 432 of the EMA 404. The EMCU 416 is also operatively coupled to (e.g., in electrical communication with) an example force sensor 434 of the EMA 404. The first electrical system 418 of FIG. 4 is operatively coupled to (e.g., in electrical communication with) the electric motor 432 of the EMA 404. The second electrical system 420 of FIG. 4 is selectively operatively couplable to (e.g., in selective electrical communication with) an example alternate electric motor 436 of the ACU 408. The first FCEU 422 of FIG. 4 is operatively coupled to (e.g., in electrical communication with) the REU 412 and the EMCU 416 via the databus 426. The second FCEU 424 of FIG. 4 is operatively coupled to (e.g., in electrical communication with) an example switch 438 and an example clutch 440 of the ACU 408. FIGS. 5-9 illustrate the HMA 402, the EMA 404, the shaft 406, the ACU 408, and the hydraulic module 410 of FIG. 4 in greater detail.

Figure 5:
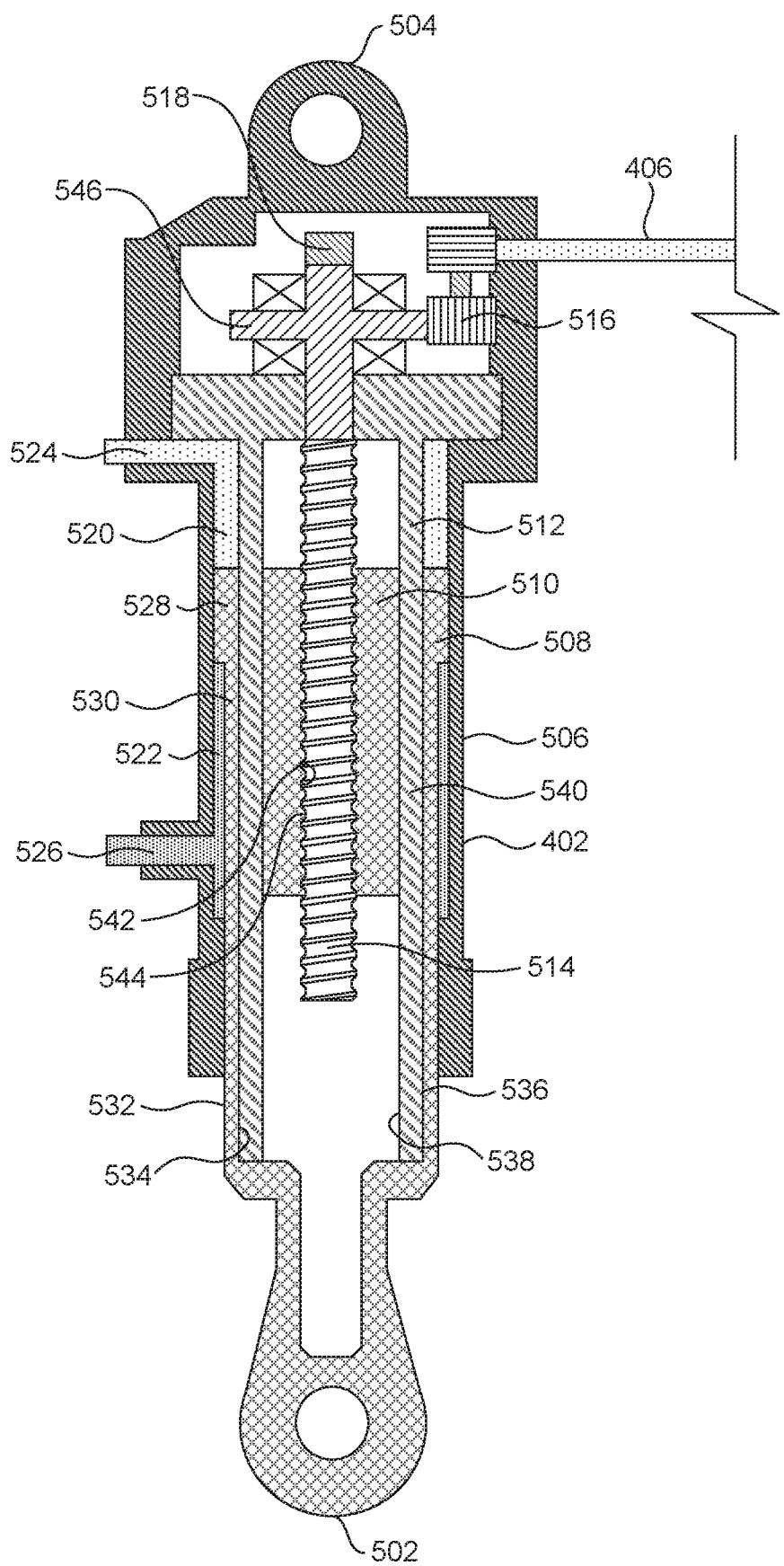
FIG. 5 is a schematic of the example HMA of FIG. 4.

FIG. 5 is a schematic of the example HMA 402 of FIG. 4. In the illustrated example of FIG. 5, the HMA 402 includes an example first end 502, an example second end 504 located opposite the first end 502, an example cylinder 506, an example piston 508, an example ball nut 510, an example case 512, an example ball screw 514, an example gearset 516, an example actuator position feedback sensor 518, an example first fluid volume 520, an example second fluid volume 522, an example first port 524, and an example second port 526. The first end 502 of the HMA 402 may be coupled to a linkage assembly (e.g., the first linkage assembly 206 of FIGS. 2A-2C) of a wing flap (e.g., the first inboard flap 112, the first outboard flap 114, the second inboard flap 118, or the second outboard flap 120 of FIGS. 1 and 3), and the second end 504 of the HMA 402 may be coupled to a corresponding wing (e.g., the first wing 102 of the second wing 104 of FIGS. 1 and 3). The cylinder 506, the piston 508, the ball nut 510, the case 512, and the ball screw 514 of the HMA 402 have respective fixed lengths. The piston 508 is positioned, disposed, and/or received within the cylinder 506 and is movable and/or slidable relative to the cylinder 506 between a retracted position and an extended position. In some examples, the HMA 402 of FIG. 5 has a first length when the piston 508 is in the retracted position relative to the cylinder 506, and a second length greater than the first length when the piston 508 is in the extended position relative to the cylinder 506.

In the illustrated example of FIG. 5, the piston 508 and the ball nut 510 of FIG. 5 are coupled to one another and/or integrally formed such that the piston 508 and the ball nut 510 move together as a unit relative to the cylinder 506. The piston 508 of FIG. 5 includes an example head 528 and an example rod 530. The rod 530 includes an example outer surface 532 and an example inner surface 534. The case 512 of FIG. 5 includes an example outer surface 536, an example inner surface 538, and an example slotted portion 540 extending between the inner and outer surfaces 538, 536 of the case 512. The outer surface 536 of the case 512 extends along the inner surface 534 of the rod 530 of the piston 508. The slotted portion 540 of the case 512 receives the coupled and/or integrated piston 508 and ball nut 510. The slotted portion 540 of the case 512 enables translation (e.g., linear motion) of the coupled and/or integrated piston 508 and ball nut 510 relative to the cylinder 506, while also preventing rotation of the coupled and/or integrated piston 508 and ball nut 510 relative to the cylinder 506.

The head 528 of piston 508 is located and/or positioned within the cylinder 506 between the first fluid volume 520 and the second fluid volume 522. The first fluid volume 520 includes and/or is a first volume of pressurized hydraulic fluid. In the illustrated example of FIG. 5, the first fluid volume 520 is in fluid communication with the first port 524 of the HMA 402, and is bounded by the cylinder 506, the head 528 of the piston 508, and the outer surface 536 of the case 512. The second fluid volume 522 includes and/or is a second volume of pressurized hydraulic fluid that is isolated from the first volume of pressurized hydraulic fluid. In the illustrated example of FIG. 5, the second fluid volume 522 is in fluid communication with the second port 526 of the HMA 402, and is bounded by the cylinder 506, the head 528 of the piston 508, and the outer surface 532 of the rod 530 of the piston 508. In some examples, one or more seal(s) may be coupled to and/or disposed on the head 528 of the piston 508, on the outer surface 532 of the rod 530 of the piston 508, and/or on the outer surface 536 of the case 512. In such examples, the seal(s) may provide one or more interface(s) between the cylinder 506, the piston 508, and/or the case 512 to isolate the first fluid volume 520 from the second fluid volume 522.

Increasing the first fluid volume 520 of FIG. 5 (e.g., increasing the volume of the pressurized hydraulic fluid of the first fluid volume 520) causes the piston 508 of FIG. 5 to move and/or slide relative to the cylinder 506 of FIG. 5 away from a retracted position and toward an extended position. A wing flap coupled via a linkage assembly to the first end 502 of the HMA 402 may move away from a retracted position and toward a deployed position in response to the piston 508 moving away from the retracted position and toward the extended position. In the illustrated example of FIG. 5, the first fluid volume 520 has a minimum volume when the piston 508 is in the retracted position, and has a maximum volume when the piston 508 is in the extended position.

Increasing the second fluid volume 522 of FIG. 5 (e.g., increasing the volume of the pressurized hydraulic fluid of the second fluid volume 522) causes the piston 508 of FIG. 5 to move and/or slide relative to the cylinder 506 of FIG. 5 away from an extended position and toward a retracted position. A wing flap coupled via a linkage assembly to the first end 502 of the HMA 402 may move away from a deployed position and toward a retracted position in response to the piston 508 moving away from the extended position and toward the retracted position. In the illustrated example of FIG. 5, the second fluid volume 522 has a minimum volume when the piston 508 is in the extended position, and has a maximum volume when the piston 508 is in the retracted position.

As described above, the ball nut 510 is coupled to and/or integrally formed with the piston 508 such that the piston 508 and the ball nut 510 move and/or slide together as a unit relative to the cylinder 506. In the illustrated example of FIG. 5, the ball nut 510 includes an example threaded portion 542. The ball screw 514 includes an example threaded portion 544 configured to engage the threaded portion 542 of the ball nut 510. The ball nut 510 is prevented from rotating relative to the cylinder 506 as a result of the coupled and/or integrally formed piston 508 and ball nut 510 being positioned within the slotted portion 540 of the case 512. Accordingly, translation (e.g., linear movement) of the piston 508 and the ball nut 510 (e.g., as may occur in response to a change in the first fluid volume 520 and/or the second fluid volume 522, as described above) causes rotation of the ball screw 514. Conversely, rotation of the ball screw 514 (as may occur in response to rotation of the shaft 406 of FIGS. 4 and 5, as further described below) causes translation of the ball nut 510 and the piston 508. Balls that function with the ball nut 510 and the ball screw 514 are omitted from FIGS. 4 and 5 in the interest of clarity of the figures.

In the illustrated example of FIG. 5, the ball screw 514 includes an example gear 546. The gear 546 may be coupled to and/or integrally formed with the ball screw 514. The gear 546 of the ball screw 514 engages the gearset 516 of the HMA 402, and the gearset 516 of the HMA 402 in turn engages the shaft 406. The gearset 516 of FIG. 5 may include any number of gears to transfer rotational motion from the gear 546 of the ball screw 514 to the shaft 406. In the illustrated example of FIG. 5, translation of the piston 508 and the ball nut 510 relative to the cylinder 506 causes rotation of the ball screw 514, which in turn causes rotation of the gear 546, which in turn causes rotation of the gearset 516, which in turn causes rotation of the shaft 406. Conversely, rotation of the shaft 406 causes rotation of the gearset 516, which in turn causes rotation of the gear 546, which in turn causes rotation of the ball screw 514, which in turn causes translation of the ball nut 510 and the piston 508 relative to the cylinder 506.

In the illustrated example of FIG. 5, the actuator position feedback sensor 518 is coupled to and/or mounted on the ball screw 514. The actuator position feedback sensor 518 senses, measures and/or detects a position of the ball screw 514 (e.g., a rotational position of the ball screw 514 relative to the cylinder 506), and/or a position of the piston 508 (e.g., a translational position of the piston 508 relative to the cylinder 506). The actuator position feedback sensor 518 of FIG. 5 is operatively coupled to (e.g., in electrical communication with) the REU 412 of FIGS. 4 and 5 such that the REU 412 may receive and/or obtain actuator position feedback data sensed, measured and/or detected via the actuator position feedback sensor 518. Actuator position feedback data obtained by the REU 412 of FIGS. 4 and 5 may be conveyed to the first FCEU 422 of FIGS. 4 and 5 via the databus 426 of FIGS. 4 and 5. In the illustrated example of FIGS. 4 and 5, the above-described electrical signals and/or connections between the REU 412 and the actuator position feedback sensor 518 of the HMA 402 are omitted in the interest of clarity of the figures.

The HMA 402 of FIGS. 4 and 5 may be actuated by any of three independent mechanisms. First, the HMA 402 may be actuated via the hydraulic system 414 and the hydraulic module 410 of FIGS. 4 and 5 when the hydraulic system 414 and the hydraulic module 410 are operational, functional, and/or active. Second, in the event of a failure of either the hydraulic system 414 or the hydraulic module 410, the HMA 402 may alternatively be actuated via the shaft 406 under the control of the EMA 404 of FIGS. 4 and 8. Third, in the event of a failure of either the hydraulic system 414 or the hydraulic module 410, and further in the event of a failure of either the first electrical system 418 or the electric motor 432 of the EMA 404, the HMA 402 may alternatively be actuated via the shaft 406 under the control of the ACU 408 of FIGS. 4 and 9.

Figure 6:
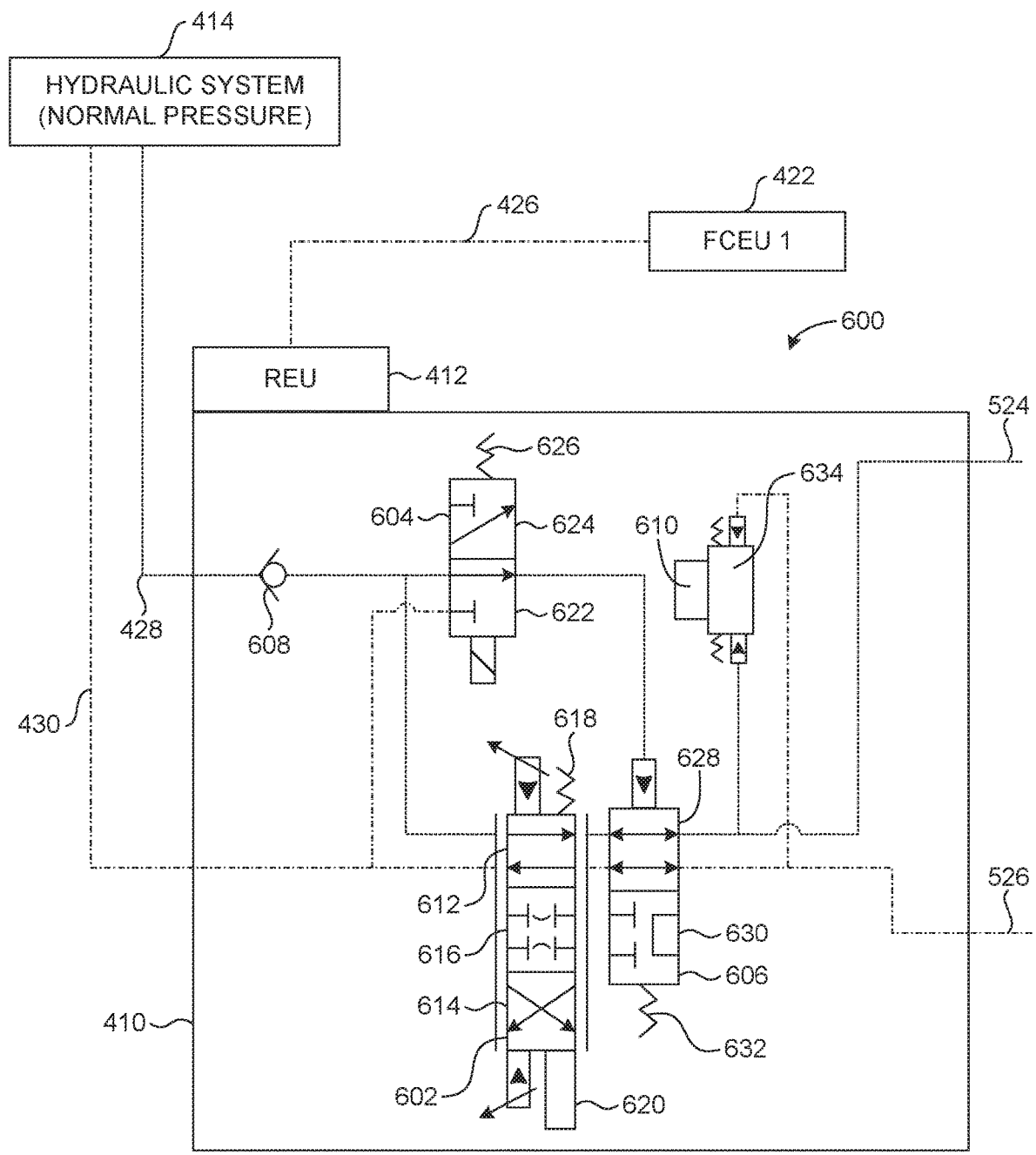
FIG. 6 is a schematic of the example hydraulic module of FIG. 4 in a first example operational mode.
Figure 7:
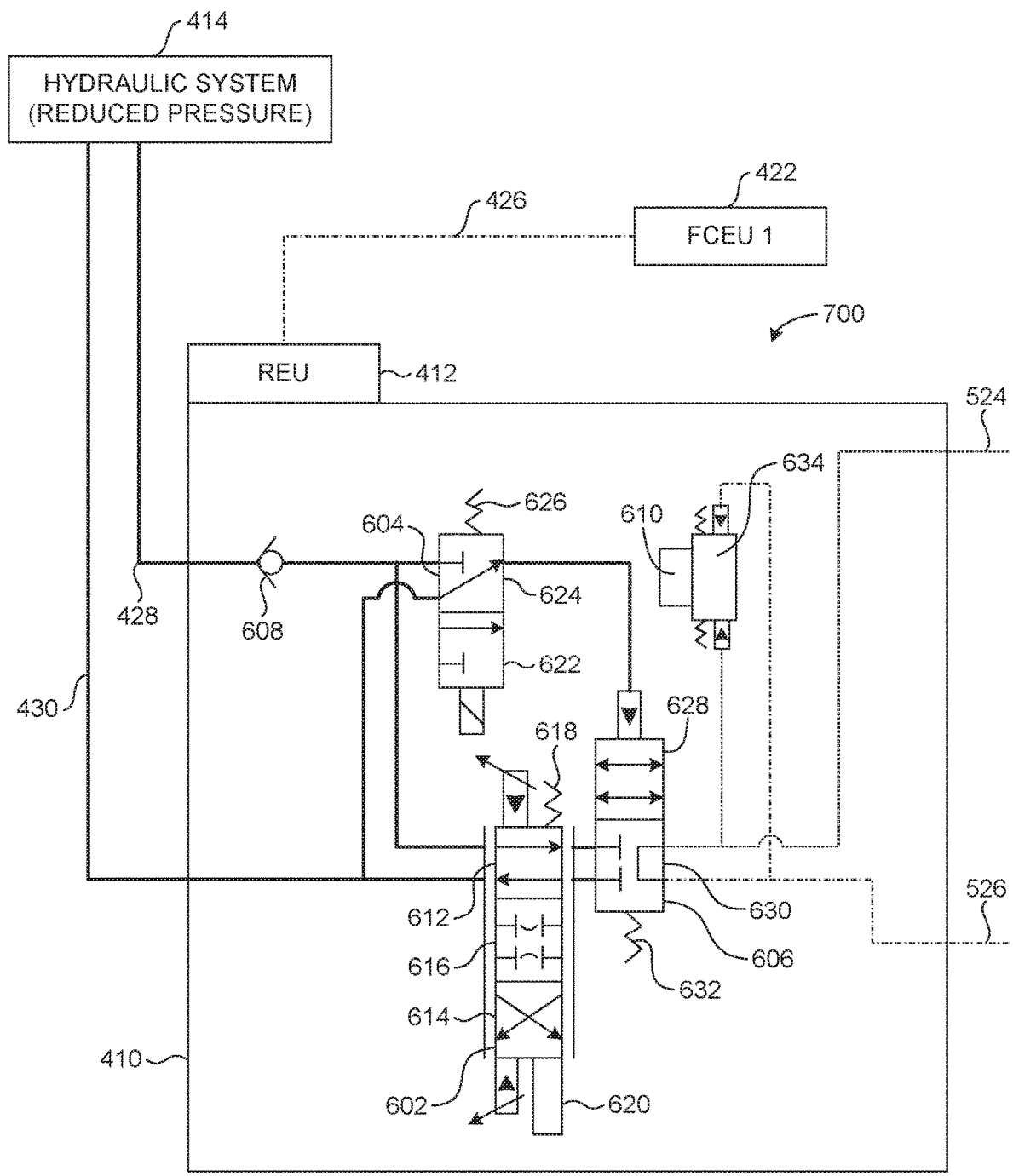
FIG. 7 is a schematic of the example hydraulic module of FIG. 4 in a second example operational mode.

FIG. 6 is a schematic of the example hydraulic module 410 of FIG. 4 in a first example operational mode 600. FIG. 7 is a schematic of the example hydraulic module 410 of FIG. 4 in a second example operational mode 700. The hydraulic module 410 of FIGS. 4, 6 and 7 may selectively place the supply line 428 of the hydraulic system 414 in fluid communication with either the 524 or the second port 526 of the HMA 402 to selectively provide pressurized hydraulic fluid to the first fluid volume 520 or the second fluid volume 522 of the HMA 402. The hydraulic module 410 of FIGS. 4, 6 an 7 may also selectively place the return line 430 in fluid communication with either the first port 524 or the second port 526 of the HMA 402 to selectively receive pressurized hydraulic fluid from the first fluid volume 520 or the second fluid volume 522 of the HMA 402. The REU 412 of FIGS. 4, 6 an 7 includes one or more processor(s) to control and/or manage loop closure, failure detection, and/or actuation control commands associated with the hydraulic module 410. In some examples, the REU 412 may be located adjacent the HMA 402. In other examples, the REU 412 may be integrated into the HMA 402.

The hydraulic module 410 of FIGS. 4, 6 and 7 includes a plurality of control valves. In some examples, one or more of the control valves may be hydraulically actuated (e.g., via pressurized hydraulic fluid supplied via the supply line 428). In some examples, one or more of the control valves may be electrically actuated (e.g., via the REU 412). The control valves of the hydraulic module 410 control and/or manage the routing and/or distribution of pressurized hydraulic fluid from the supply line 428 to the ports of the HMA 402 (e.g., the first and second ports 524, 526 of FIG. 5 described above), and from the ports of the HMA 402 to the return line 430. In the illustrated examples of FIGS. 6 and 7, the HMA 402 includes an example electrohydraulic servo valve (EHSV) 602, an example solenoid valve (SOV) 604, an example mode selector valve (MSV) 606, an example check valve 608, and an example force sensor 610.

The EHSV 602 of FIGS. 6 and 7 is a four-way flow-control valve which produces flow as a function of input current. The EHSV 602 has three control ports that are movable and/or actuatable between an example first control port position 612 (e.g., a flap deployment flow position), an example second control port position 614 (e.g., a flap retraction flow position), and an example third control port position 616 (e.g., a null region). The EHSV 602 includes and/or is coupled to an example first bias spring 618 and an example LVDT 620. The first bias spring 618 biases the EHSV 602 into and/or toward the first control port position 612 of the EHSV 602. The LVDT 620 senses, measures and/or detects a position of the EHSV 602. In the illustrated examples of FIGS. 6 and 7, the EHSV 602 is operatively coupled to (e.g., in electrical communication with) the REU 412. The REU 412 selectively positions the EHSV 602 in one of the first, second, or third control port positions 612, 614, 616 of the EHSV 602. For example, the REU 412 may energize the EHSV 602 to move from the first control port position 612 into the second control port position 614 over the bias generated by the first bias spring 618. In some examples, the REU 412 transmits a control signal to the EHSV 602 to control the position of the EHSV 602. The REU 412 also receives an electrical signal from an actuator position feedback sensor of the HMA 402 (e.g., the actuator position feedback sensor 518 of the HMA 402) associated with the REU 412 and the hydraulic module 410. In the illustrated example of FIGS. 4, 6 and 7, the above-described electrical signals and/or connections between the REU 412 and the EHSV 602 of the hydraulic module 410 are omitted in the interest of clarity of the figures.

The SOV 604 of FIGS. 6 and 7 is a two-position valve having control ports that are movable and/or actuatable between an example first control port position 622 (e.g., a normal flow position) and an example second control port position 624 (e.g., a diverted flow position). The SOV 604 includes and/or is coupled to an example second bias spring 626. The second bias spring 626 biases the SOV 604 into and/or toward the second control port position 624 of the SOV 604. In the illustrated examples of FIGS. 6 and 7, the SOV 604 is operatively coupled to (e.g., in electrical communication with) the REU 412. The REU 412 selectively positions the SOV 604 in one of the first or second control port positions 622, 624 of the SOV 604. For example, the REU 412 may energize and/or electrically command the SOV 604 to move from the second control port position 624 into the first control port position 622 over the bias generated by the second bias spring 626. In some examples, the REU 412 may de-energize the SOV 604 in response to detecting and/or determining that a difference between an electrical signal from the LVDT 620 of the EHSV 602 and a calculated position of the EHSV 602 exceeds a threshold (e.g., a predetermined threshold), as may occur in the case of a run-away and/or improperly functioning actuator. In the illustrated example of FIGS. 4, 6 and 7, the above-described electrical signals and/or connections between the REU 412 and the SOV 604 of the hydraulic module 410 are omitted in the interest of clarity of the figures.

The MSV 606 of FIGS. 6 and 7 is a two-position valve having control ports that are movable and/or actuatable between an example first control port position 628 (e.g., an active flow position) and an example second control port position 630 (e.g., a bypassed flow position). The MSV 606 includes and/or is coupled to an example third bias spring 632. The third bias spring 632 biases the MSV 606 into and/or toward the second control port position 630 of the MSV 606. In the illustrated examples of FIGS. 6 and 7, the MSV 606 is operatively coupled to (e.g., in fluid communication with) the SOV 604. The SOV 604 selectively positions the MSV 606 in one of the first or second control port positions 628, 630 of the MSV 606. For example, the SOV 604 may supply pressurized hydraulic fluid to the MSV 606 to move the MSV 606 from the second control port position 630 into the first control port position 628 over the bias generated by the third bias spring 632.

When the MSV 606 of FIGS. 6 and 7 is positioned in the second control port position 630 (e.g., the bypassed flow position), pressurized hydraulic fluid contained within the first fluid volume 520 of the HMA 402 freely passes from the first fluid volume 520 through the first port 524 of the HMA 402, through the MSV 606 of the hydraulic module 410, through the second port 526 of the HMA 402, and into the second fluid volume 522 of the HMA 402. Pressurized hydraulic fluid contained within the second fluid volume 522 of the HMA 402 also freely passes from the second fluid volume 522 through the second port 526 of the HMA 402, through the MSV 606 of the hydraulic module 410, through the first port 524 of the HMA 402, and into the first fluid volume 520 of the HMA 402. The unrestricted exchange and/or bypass of pressurized hydraulic fluid between the first fluid volume 520 and the second fluid volume 522 of the HMA 402 enables the piston 508 of the HMA 402 to be freely movable. The position of the piston 508 and/or the position of a wing flap to which the piston 508 is coupled is/are accordingly freely movable when the MSV 606 of the hydraulic module 410 is in the second control port position 630 (e.g., the bypassed flow position).

The check valve 608 of FIGS. 6 and 7 blocks pressurized hydraulic fluid that has passed in a first direction through the check valve 608 from returning through the check valve in a second direction opposite the first direction. The force sensor 610 of FIGS. 6 and 7 senses, measures and/or detects a force and/or pressure associated with the pressurized hydraulic fluid at the first fluid volume 520 and/or the first port 524 of the HMA 402 and at the second fluid volume 522 and/or the second port 526 of the HMA 402. The force sensor 610 includes an example LVDT 634. Based on the instantaneous position of the HMA 402, the pressurized hydraulic fluid at the first fluid volume 520 and/or the first port 524 of the HMA 402 and at the second fluid volume 522 and/or the second port 526 of the HMA 402 results in an instantaneous position of the LVDT 634 of the force sensor 610. The force sensor 610 is operatively coupled to (e.g., in electrical communication with) the REU 412. The REU 412 receives an electrical signal from the LVDT 634 of the force sensor 610. For example, an electrical signal corresponding to the instantaneous position of the LVDT 634 may be transmitted from the force sensor 610 to the REU 412, and from the REU 412 to the first FCEU 422. The electrical signal may be processed via the first FCEU 422 to determine an instantaneous force applied to the wing flap (e.g., the first inboard flap 112). In the illustrated example of FIGS. 4, 6 and 7, the above-described electrical signals and/or connections between the REU 412 and the force sensor 610 of the HMA 402 are omitted in the interest of clarity of the figures.

The first operational mode 600 of FIG. 6 corresponds to an active mode of operation of the hydraulic module 410 of FIG. 4, in which the hydraulic system 414 of FIG. 4 is operating according to normal and/or intended conditions. When the hydraulic module 410 is in the first operational mode 600 of FIG. 6, pressurized hydraulic fluid (e.g., pressurized hydraulic fluid generated by the hydraulic system 414) is supplied from the hydraulic system 414 to the hydraulic module 410 via the supply line 428. The SOV 604 of the hydraulic module 410 is energized (e.g., ON). The EHSV 602 is in the first control port position 612 of the EHSV 602, the SOV 604 is in the first control port position 622 of the SOV 604, and the MSV 606 is in the first control port position 628 (e.g., the active flow position) of the MSV 606. In other examples, the EHSV 602 may be in the second control port position 614 of the EHSV 602 when the hydraulic module 410 is in the first operational mode 600 of FIG. 6. The HMA 402 of FIG. 4 is in an active mode when the hydraulic module 410 of FIG. 4 is in the first operational mode 600 of FIG. 6.

The second operational mode 700 of FIG. 7 corresponds to a bypassed mode of operation of the hydraulic module 410 of FIG. 4, in which the hydraulic system 414 of FIG. 4 is not operating according to normal and/or intended conditions (e.g., due to a partial or complete loss of pressure associated with the hydraulic system 414). When the hydraulic module 410 is in the second operational mode 700 of FIG. 7, pressurized hydraulic fluid (e.g., pressurized hydraulic fluid generated by the hydraulic system 414) is either not supplied, or is supplied at a reduced pressure, from the hydraulic system 414 to the hydraulic module 410 via the supply line 428. The SOV 604 of the hydraulic module 410 is deenergized (e.g., OFF). The EHSV 602 is in the first control port position 612 of the EHSV 602, the SOV 604 is in the second control port position 624 of the SOV 604, and the MSV 606 is in the second control port position 630 (e.g., the bypassed flow position) of the MSV 606. In other examples, the EHSV 602 may be in the second control port position 614 of the EHSV 602 when the hydraulic module 410 is in the second operational mode 700 of FIG. 7. The HMA 402 of FIG. 4 is in a bypassed mode when the hydraulic module 410 of FIG. 4 is in the second operational mode 700 of FIG. 7.

Figure 8:
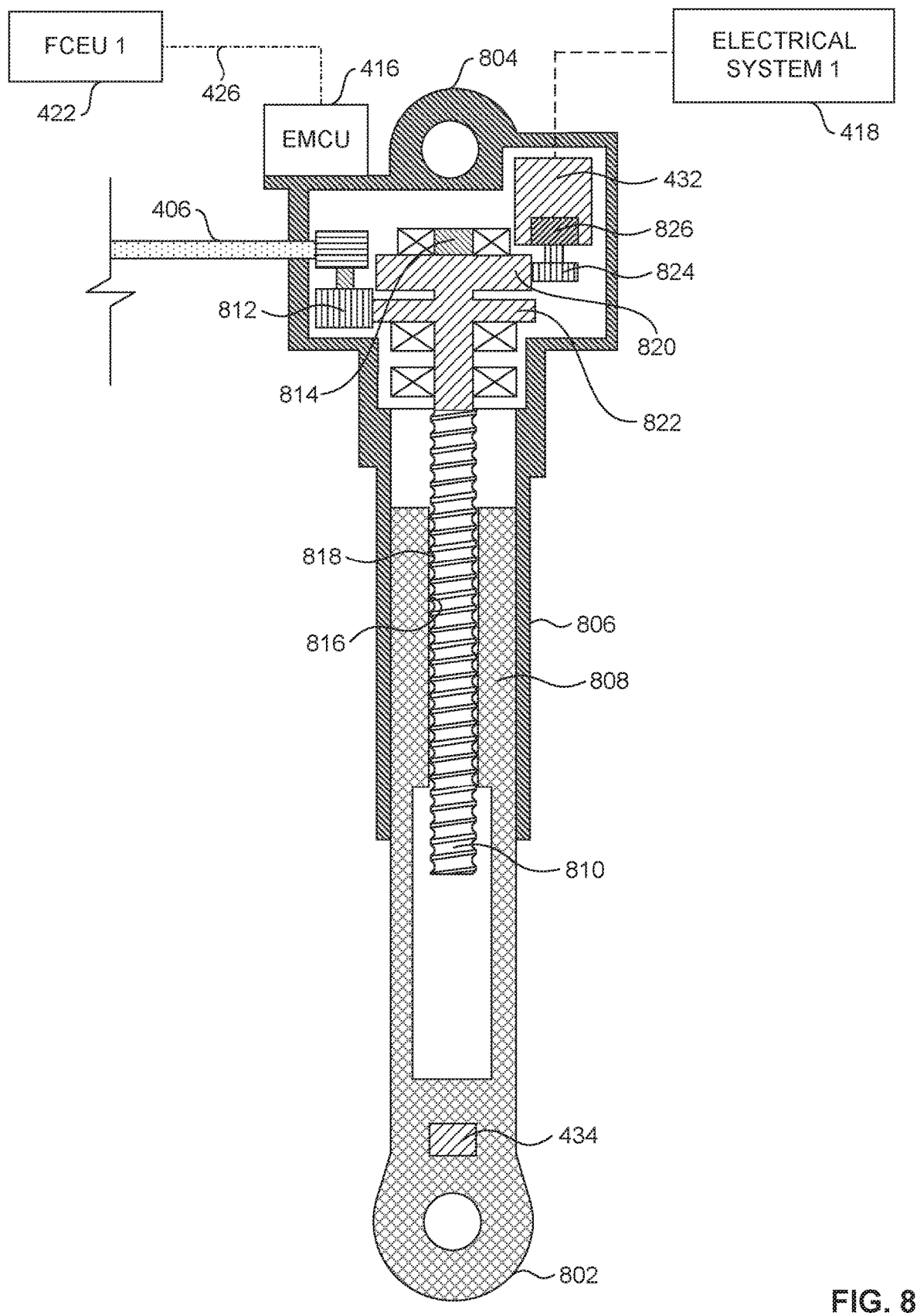
FIG. 8 is a schematic of the example EMA of FIG. 4.

FIG. 8 is a schematic of the example EMA 404 of FIG. 4. In the illustrated example of FIG. 8, the EMA 404 includes an example first end 802, an example second end 804 located opposite the first end 802, an example case 806, an example ball nut 808, an example ball screw 810, an example gearset 812, an example actuator position feedback sensor 814, the electric motor 432, and the force sensor 434. The first end 802 of the EMA 404 may be coupled to a linkage assembly (e.g., the second linkage assembly 208 of FIGS. 2A, 2D and 2E) of a wing flap (e.g., the first inboard flap 112, the first outboard flap 114, the second inboard flap 118, or the second outboard flap 120 of FIGS. 1 and 3), and the second end 804 of the EMA 404 may be coupled to a corresponding wing (e.g., the first wing 102 of the second wing 104 of FIGS. 1 and 3). The case 806, the ball nut 808, and the ball screw 810 of the EMA 404 have respective fixed lengths. The ball nut 808 is configured to receive the ball screw 810. The ball nut 808 is positioned, disposed, and/or received within the case 806 and is movable and/or slidable, but not rotatable, relative to the case 806 between a retracted position and an extended position. In some examples, the EMA 404 of FIG. 8 has a first length when the ball nut 808 is in the retracted position relative to the case 806, and a second length greater than the first length when the ball nut 808 is in the extended position relative to the case 806.

In the illustrated example of FIG. 8, the ball nut 808 includes an example threaded portion 816. The ball screw 810 includes an example threaded portion 818 configured to engage the threaded portion 816 of the ball nut 808. Movement (e.g., rotation) of the ball screw 810 of the EMA 404 in a first rotational direction causes movement (e.g., translation) of the ball nut 808 of the EMA 404 relative to the case 806 of the EMA 404 in a first translational direction. For example, rotating the ball screw 810 of FIG. 8 in a clockwise direction may cause the ball nut 808 of FIG. 8 to move and/or slide relative to the case 806 of FIG. 8 away from a retracted position and toward an extended position. A wing flap coupled via a linkage assembly to the first end 802 of the EMA 404 may move away from a retracted position and toward a deployed position in response to the ball nut 808 moving away from the retracted position and toward the extended position.

Conversely, movement (e.g., rotation) of the ball screw 810 of the EMA 404 in a second rotational direction opposite the first rotational direction causes movement (e.g., translation) of the ball nut 808 of the EMA 404 relative to the case 806 of the EMA 404 in a second translational direction opposite the first translational direction. For example, rotating the ball screw 810 of FIG. 8 in a counter-clockwise direction may cause the ball nut 808 of FIG. 8 to move and/or slide relative to the case 806 of FIG. 8 away from an extended position and toward a retracted position. A wing flap coupled via a linkage assembly to the first end 802 of the EMA 404 may move away from a deployed position and toward a retracted position in response to the ball nut 808 moving away from the extended position and toward the retracted position. Balls that function with the ball nut 808 and the ball screw 810 are omitted from FIGS. 4 and 8 in the interest of clarity of the figures.

In the illustrated example of FIG. 8, the ball screw 810 further includes an example first gear 820 and an example second gear 822. The first gear 820 of the ball screw 810 may be coupled to and/or integrally formed with the ball screw 810. The second gear 822 of the ball screw 810 may also be coupled to and/or integrally formed with the ball screw 810. In the illustrated example of FIG. 8, the second gear 822 of the ball screw 810 is spaced apart from the first gear 820 of the ball screw 810 along the longitudinal axis of the ball screw 810. The first gear 820 of the ball screw 810 engages an example output gear 824 of the electric motor 432. The second gear 822 of the ball screw 810 engages the gearset 812 of the EMA 404, and the gearset 812 of the EMA 404 in turn engages the shaft 406. The gearset 812 of FIG. 8 may include any number of gears to transfer rotational motion from the second gear 822 of the ball screw 810 to the shaft 406.

In the illustrated example of FIG. 8, rotation of the output gear 824 of the electric motor 432 is controlled via the EMCU 416 and an example electric brake 826 of the electric motor 432. In some examples, the electric brake 826 may be implemented via one or more brake disc(s) that is/are movable and/or actuatable via a solenoid valve controlled by the EMCU 416. As mentioned above, the electric motor 432 is powered via the first electrical system 418 of FIGS. 4 and 8. The electric brake 826 is operatively coupled to the EMCU 416 of FIGS. 4 and 8. In the illustrated example of FIGS. 4 and 8, the above-described electrical signals and/or connections between the EMCU 416 and the electric motor 432 and/or electric brake 826 of the EMA 404 are omitted in the interest of clarity of the figures.

In some examples, the electric brake 826 is released and/or deactivated in connection with a first operational mode (e.g., an active mode) of the EMA 404. When the electric brake 826 is released and/or deactivated, the electric motor 432 rotates the output gear 824. Rotation of the output gear 824 of the electric motor 432 causes rotation of the first gear 820 of the ball screw 810, which in turn causes rotation of the ball screw 810, which in turn causes translation of the ball nut 808 relative to the case 806. Rotation of the first gear 820 of the ball screw 810 via the output gear 824 of the electric motor 432 also causes rotation of the second gear 822 of the ball screw 810, which in turn causes rotation of the gearset 812, which in turn causes rotation of the shaft 406.

In some examples, the electric brake 826 is engaged and/or activated in connection with a second operational mode (e.g., a floated mode) of the EMA 404. When the electric brake 826 is engaged and/or activated, the electric motor 432 does not actively rotate the output gear 824 of the electric motor 432, and the electric motor 432 accordingly has no control over the rotation of the ball screw 810 and/or the translation of the ball nut 808. When the electric brake 826 is engaged and/or activated, the shaft 406 may rotate the gearset 812 of the EMA 404. Rotation of the gearset 812 via the shaft 406 causes rotation of the second gear 822 of the ball screw 810, which in turn causes rotation of the ball screw 810, which in turn causes translation of the ball nut 808 relative to the case 806.

In the illustrated example of FIG. 8, the actuator position feedback sensor 814 is coupled to and/or mounted on the ball screw 810. The actuator position feedback sensor 814 senses, measures and/or detects a position of the ball screw 810 (e.g., a rotational position of the ball screw 810 relative to the case 806), and/or a position of the ball nut 808 (e.g., a translational position of the ball nut 808 relative to the case 806). The actuator position feedback sensor 814 of FIG. 8 is operatively coupled to (e.g., in electrical communication with) the EMCU 416 of FIGS. 4 and 8 such that the EMCU 416 may receive and/or obtain actuator position feedback data sensed, measured and/or detected via the actuator position feedback sensor 814. Actuator position feedback data obtained by the EMCU 416 of FIGS. 4 and 8 may be conveyed to the first FCEU 422 of FIGS. 4 and 8 via the databus 426 of FIGS. 4 and 8. In the illustrated example of FIGS. 4 and 8, the above-described electrical signals and/or connections between the EMCU 416 and the actuator position feedback sensor 814 of the EMA 404 are omitted in the interest of clarity of the figures.

In the illustrated example of FIGS. 4 and 8, the force sensor 434 is implemented via a strain gauge mounted on the EMA 404 adjacent the first end 802 of the EMA 404. The force sensor 434 senses, measures and/or detects an instantaneous force based on an instantaneous position of the EMA 404. The force sensor 434 is operatively coupled to (e.g., in electrical communication with) the EMCU 416 of FIGS. 4 and 8 such that the EMCU 416 may receive and/or obtain actuator force data sensed, measured and/or detected via the force sensor 434. Actuator force data obtained by the EMCU 416 of FIGS. 4 and 8 may be conveyed to the first FCEU 422 of FIGS. 4 and 8 via the databus 426 of FIGS. 4 and 8. For example, an electrical signal corresponding to the instantaneous force of the EMA 404 may be transmitted from the force sensor 434 to the EMCU 416, and from the EMCU 416 to the first FCEU 422. The electrical signal may be processed via the first FCEU 422 to determine an instantaneous force applied to the wing flap (e.g., the first inboard flap 112). In the illustrated example of FIGS. 4 and 8, the above-described electrical signals and/or connections between the EMCU 416 and the force sensor 434 of the EMA 404 are omitted in the interest of clarity of the figures.

In some examples, the first FCEU 422 may compare the instantaneous force associated with the force sensor 434 of the EMA 404 to the instantaneous force associated with the force sensor 610 of the hydraulic module 410 of the HMA 402. The two instantaneous forces are processed by the first FCEU 422 which then issues an instantaneous position tracking command to the HMA 402 via the REU 412 and to the EMA 404 via the EMCU 416. In response to the instantaneous position tracking command, a force fight and/or force deviation between the ball screw 514 and the gearset 516 of the HMA 402, the ball screw 810 and the gearset 812 of the EMA 404, and the shaft 406 is reduced (e.g., minimized or eliminated).

The EMA 404 of FIGS. 4 and 8 may be actuated by any of three independent mechanisms. First, the EMA 404 may be actuated via the first electrical system 418 and the electric motor 432 when the first electrical system 418 and the electric motor 432 are operational, functional, and/or active. Second, in the event of a failure of either the first electrical system 418 or the electric motor 432, the EMA 404 may alternatively be actuated via the shaft 406 under the control of the HMA 402 of FIGS. 4 and 5. Third, in the event of a failure of either the first electrical system 418 or the electric motor 432, and further in the event of either the hydraulic system 414 or the hydraulic module 410 of the HMA 402, the EMA 404 may alternatively be actuated via the shaft 406 under the control of the ACU 408 of FIGS. 4 and 9.

FIG. 9 is a schematic of the example shaft 406 and the example ACU 408 of FIG. 4. In some examples, the ACU 408 is mounted on the shaft 406. In other examples, the ACU 408 may be operatively coupled to, but located remotely from, the shaft 406. In the illustrated example of FIGS. 4 and 9, the shaft 406 is a flexible shaft that transfers rotational motion from the gearset 516 of the HMA 402 to the gearset 812 of the EMA 404, and vice-versa. The flexibility of the shaft 406 enable the shaft 406 to be installed in a confined space of the aircraft 100. In some examples, the shaft 406 may be non-flexible and/or rigid. In some examples, the shaft 406 may be implemented as multiple shafts (e.g., two or more shafts) in an end-to-end configuration. The shaft 406 of FIGS. 4 and 9 includes an example gear 902. The gear 902 of the shaft 406 may be coupled to and/or integrally formed with the shaft 406. The gear 902 of the shaft 406 engages an example gear 904 of the ACU 408. The gear 904 of the ACU 408 is selectively operatively coupled to the alternate electric motor 436 and/or the clutch 440 of the ACU 408, as further described below.

In the illustrated example of FIGS. 4 and 9, the switch 438 of the ACU 408 is moveable and/or actuatable between an open position and a closed position. The switch 438 may be moved and/or actuated between the open position and the closed position in response to one or more command(s) received from the second FCEU 424. For example, the second FCEU 424 may command the ACU 408 into a floated mode by opening the switch 438 of the ACU 408. When the switch 438 of the ACU 408 is in the open position (e.g., when the ACU 408 is in the floated mode), the second electrical system 420 is disconnected from the alternate electric motor 436 of the ACU 408, and the clutch 440 is disengaged from the gear 904 of the ACU 408. In some examples, the clutch 440 may become disengaged in response to one or more command(s) received from the second FCEU 424. The ACU 408 does not control rotation of the shaft 406 when the switch 438 is in the open position and/or when the ACU 408 is in the floated mode.

The second FCEU 424 may alternatively command the ACU 408 into an active mode by closing the switch 438 of the ACU 408. When the switch 438 of the ACU 408 is in the closed position (e.g., when the ACU 408 is in the active mode), the second electrical system 420 is connected to the alternate electric motor 436 of the ACU 408, and the clutch 440 is engaged with the gear 904 of the ACU 408. In some examples, the clutch 440 may become engaged in response to one or more command(s) received from the second FCEU 424. In response to being powered by the second electrical system 420, the alternate electric motor 436 controls rotation (e.g., via the engaged clutch 440) of the gear 904 of the ACU 408, and therefore also controls rotation of the gear 902 of the shaft 406. The ACU 408 accordingly controls rotation of the shaft 406 when the switch 438 is in the closed position and/or when the ACU 408 is in the active mode.

As described above, rotation of the shaft 406 may be selectively controlled via the ACU 408. In some examples, the ACU 408 may be activated to control rotation of the shaft 406 in response to a failure of both the HMA 402 and the EMA 404 of FIG. 4. In such examples, the shaft 406 may be rotated via the ACU 408 to move and or actuate the HMA 402 and/or the EMA 404 even though the HMA 402 may not be hydraulically actuatable (e.g., via the hydraulic system 414 and/or the hydraulic module 410), and/or even though the EMA 404 may not be electronically actuatable (e.g., via the first electrical system 418 and/or the electric motor 432. In some examples, the ACU 408 may be activated to control rotation of the shaft 406 in response to the first FCEU 422 and/or the second FCEU 424 detecting an asymmetry between a first wing flap associated with the ACU 408 (e.g., the first inboard flap 112 of FIG. 1) and a second wing flap (e.g., the second inboard flap 118 of FIG. 1). In such examples, the ACU 408 may be commanded via the first FCEU 422 and/or the second FCEU 424 to control rotation of the shaft 406 to rectify the detected asymmetry.

Figure 10A:
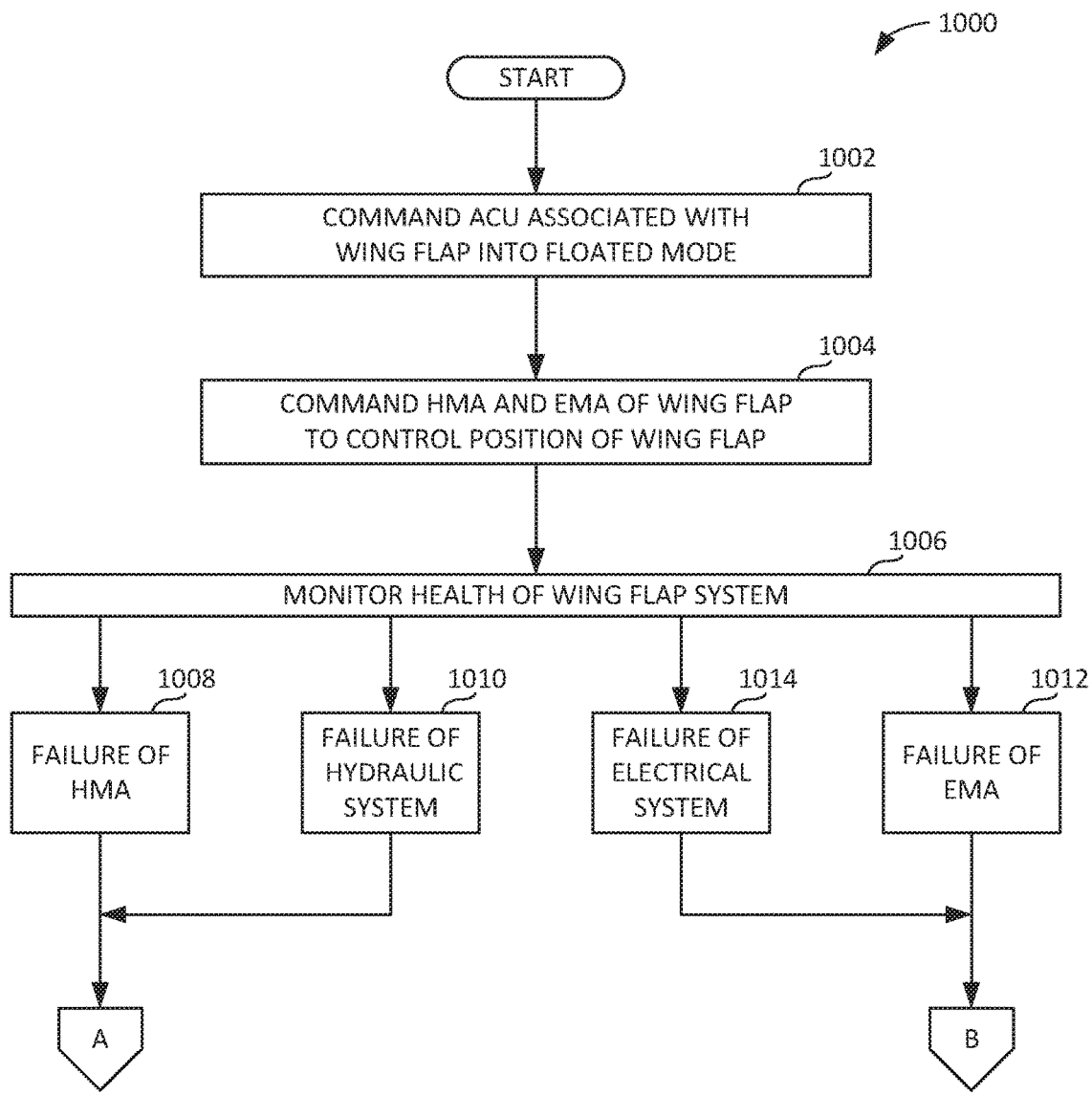
FIGS. 10A-10C are a flowchart representative of an example method for implementing the example distributed trailing edge wing flap system of FIGS. 3-9 to control the position of a wing flap.
Figure 10B:
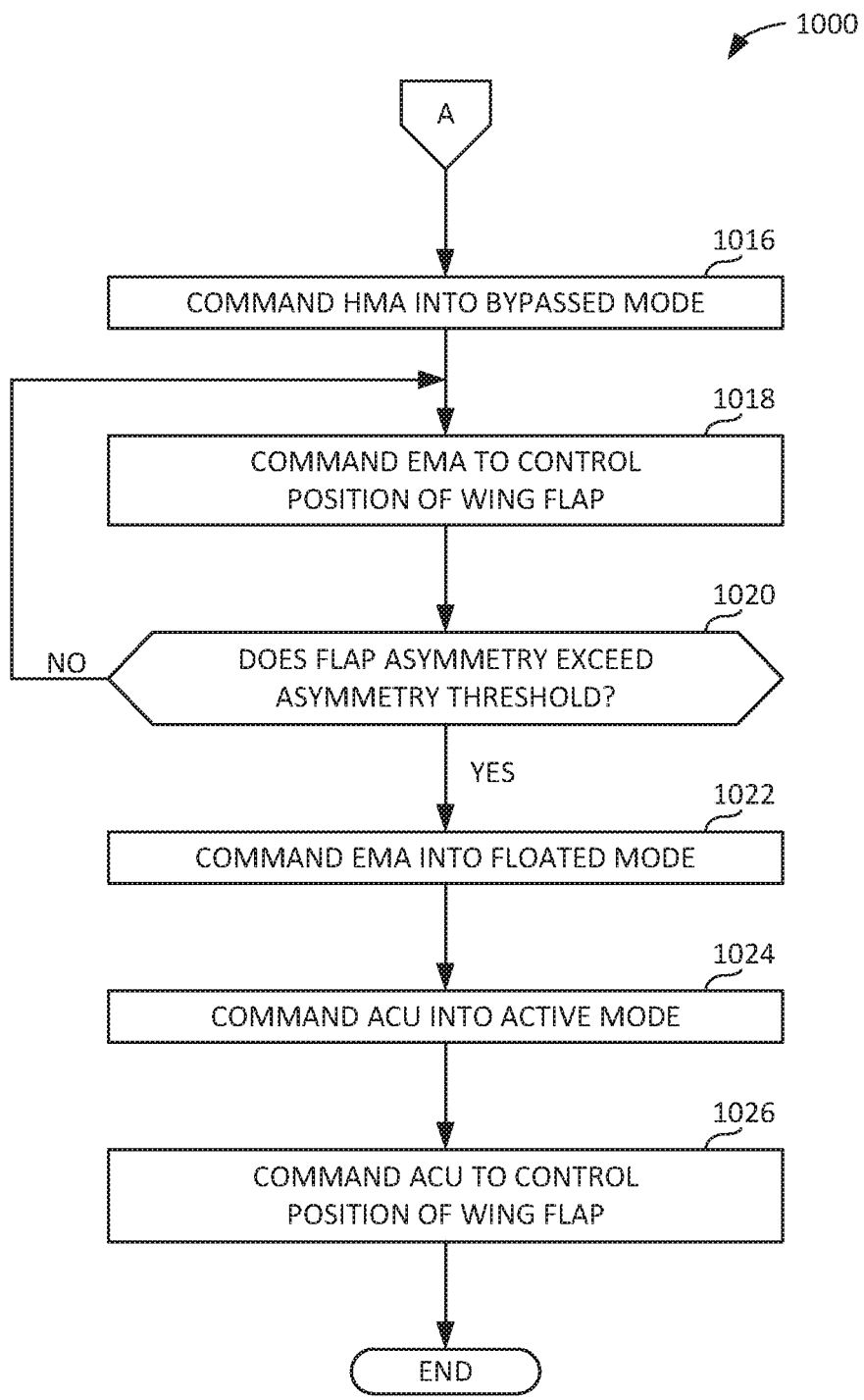
Figure 10C:
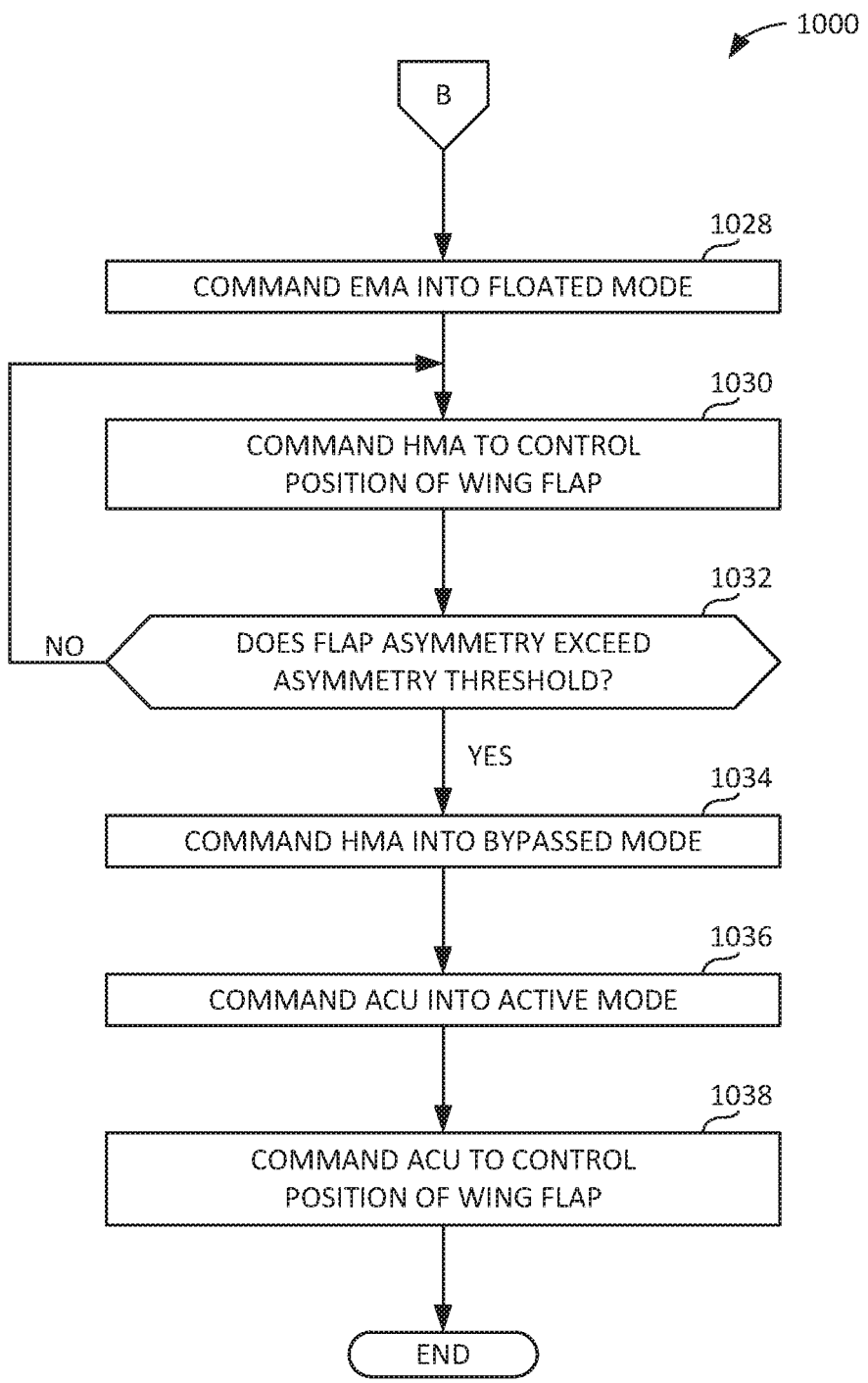

FIGS. 10A-10C are a flowchart representative of an example method 1000 for implementing the example distributed trailing edge wing flap system 300 of FIGS. 3-9 to control the position of a wing flap. The method 1000 of FIGS. 10A-10C begins with commanding an ACU associated with a wing flap of the distributed trailing edge wing flap system 300 into a floated mode (block 1002). For example, the second FCEU 424 of FIG. 4 may command the ACU 408 of FIG. 4 associated with a wing flap (e.g., the first inboard flap 112 of FIG. 3) into a floated mode. In some examples, the second FCEU 424 may command the ACU 408 into the floated mode by opening the switch 438 of the ACU 408, by disconnecting the second electrical system 420 from the alternate electric motor 436 of the ACU 408, and/or by disengaging the clutch 440 of the ACU 408. Following block 1002, the method 1000 of FIGS. 10A-10C proceeds to block 1004.

The method 1000 of FIGS. 10A-10C includes commanding the HMA and the EMA of the wing flap to control the position of the wing flap (block 1004). For example, the first FCEU 422 of FIG. 4 may command the HMA 402 of FIG. 4, via the REU 412 of FIG. 4 and/or the hydraulic module 410 of FIG. 4, to control the position of the wing flap. The first FCEU 422 of FIG. 4 may also command the EMA 404 of FIG. 4, via the EMCU 416 of FIG. 4 and/or the electric motor 432 of FIG. 4, to control the position of the wing flap. In some examples, the first FCEU 422 may command the HMA 402 and the EMA 404 to concurrently and/or simultaneously control the position of the wing flap. Following block 1004, the method 1000 of FIGS. 10A-10C proceeds to block 1006.

The method 1000 of FIGS. 10A-10C includes monitoring the health of the distributed trailing edge wing flap system 300 (block 1006). For example, the first FCEU 422 of FIG. 4 may monitor the health of the HMA 402, the EMA 404, the hydraulic system 414, and/or the first electrical system 418 of FIG. 4. In connection with monitoring the health of the distributed trailing edge wing flap system 300, the first FCEU 422 may determine whether the HMA 402, the EMA 404, the hydraulic system 414, and/or the first electrical system 418 is/are functioning properly, or whether the HMA 402, the EMA 404, the hydraulic system 414, and/or the first electrical system 418 has/have failed.

If the first FCEU 422 of FIG. 4 determines that the HMA 402 of FIG. 4 has failed (block 1008) while monitoring the health of the distributed trailing edge wing flap system 300, the method 1000 of FIGS. 10A-10C proceeds to block 1016. If the first FCEU 422 of FIG. 4 determines that the hydraulic system 414 of FIG. 4 has failed (block 1010) while monitoring the health of the distributed trailing edge wing flap system 300, the method 1000 of FIGS. 10A-10C proceeds to block 1016. If the first FCEU 422 of FIG. 4 determines that the EMA 404 of FIG. 4 has failed (block 1012) while monitoring the health of the distributed trailing edge wing flap system 300, the method 1000 of FIGS. 10A-10C proceeds to block 1028. If the first FCEU 422 of FIG. 4 determines that the first electrical system 418 of FIG. 4 has failed (block 1014) while monitoring the health of the distributed trailing edge wing flap system 300, the method 1000 of FIGS. 10A-10C proceeds to block 1028.

At block 1016, the first FCEU 422 of FIG. 4 commands the HMA 402 of FIG. 4 into a bypassed mode (block 1016). For example, the first FCEU 422 of FIG. 4 may command the HMA 402 of FIG. 4, via the REU 412 of FIG. 4 and/or the hydraulic module 410 of FIG. 4, into the bypassed mode. Following block 1016, the method 1000 of FIGS. 10A-10C proceeds to block 1018.

At block 1018, the first FCEU 422 of FIG. 4 commands the EMA 404 of FIG. 4 to control the position of the wing flap (block 1018). For example, the first FCEU 422 of FIG. 4 may command the EMA 404 of FIG. 4, via the EMCU 416 of FIG. 4 and/or the electric motor 432 of FIG. 4, to control the position of the wing flap. Following block 1018, the method 1000 of FIGS. 10A-10C proceeds to block 1020.

At block 1020, the first FCEU 422 of FIG. 4 determines whether an asymmetry between the wing flap (e.g., the first inboard flap 112 of FIG. 3) and another wing flap (e.g., the second inboard flap 118 of FIG. 3) exceeds an asymmetry threshold (block 1020). If the first FCEU 422 determines at block 1020 that the asymmetry between the two wing flaps does not exceed the asymmetry threshold, the method 1000 of FIGS. 10A-10C returns to block 1018. If the first FCEU 422 instead determines at block 1020 that the asymmetry between the two wing flaps exceeds the asymmetry threshold, the method 1000 of FIGS. 10A-10C proceeds to block 1022.

At block 1022, the first FCEU 422 of FIG. 4 commands the EMA 404 of FIG. 4 into a floated mode (block 1022). For example, the first FCEU 422 of FIG. 4 may command the EMA 404 of FIG. 4, via the EMCU 416 of FIG. 4 and/or the electric motor 432 of FIG. 4, into the floated mode. Following block 1022, the method 1000 of FIGS. 10A-10C proceeds to block 1024.

At block 1024, the second FCEU 424 of FIG. 4 commands the ACU 408 of FIG. 4 into an active mode (block 1024). In some examples, the second FCEU 424 may command the ACU 408 into the active mode by closing the switch 438 of the ACU 408, by connecting the second electrical system 420 to the alternate electric motor 436 of the ACU 408, and/or by engaging the clutch 440 of the ACU 408. Following block 1024, the method 1000 of FIGS. 10A-10C proceeds to block 1026.

At block 1026, the second FCEU 424 of FIG. 4 commands the ACU 408 of FIG. 4 to control the position of the wing flap (block 1026). For example, the second FCEU 424 of FIG. 4 may command the ACU 408 of FIG. 4, via the alternate electric motor 436 of FIG. 4 and/or the clutch 440 of FIG. 4, to control the position of the wing flap. Following block 1026, the method 1000 of FIGS. 10A-10C ends.

At block 1028, the first FCEU 422 of FIG. 4 commands the EMA 404 of FIG. 4 into a floated mode (block 1028). For example, the first FCEU 422 of FIG. 4 may command the EMA 404 of FIG. 4, via the EMCU 416 of FIG. 4 and/or the electric motor 432 of FIG. 4, into the floated mode. Following block 1028, the method 1000 of FIGS. 10A-10C proceeds to block 1030.

At block 1030, the first FCEU 422 of FIG. 4 commands the HMA 402 of FIG. 4 to control the position of the wing flap (block 1030). For example, the first FCEU 422 of FIG. 4 may command the HMA 402 of FIG. 4, via the REU 412 of FIG. 4 and/or the hydraulic module 410 of FIG. 4, to control the position of the wing flap. Following block 1030, the method 1000 of FIGS. 10A-10C proceeds to block 1032.

At block 1032, the first FCEU 422 of FIG. 4 determines whether an asymmetry between the wing flap (e.g., the first inboard flap 112 of FIG. 3) and another wing flap (e.g., the second inboard flap 118 of FIG. 3) exceeds an asymmetry threshold (block 1032). If the first FCEU 422 determines at block 1032 that the asymmetry between the two wing flaps does not exceed the asymmetry threshold, the method 1000 of FIGS. 10A-10C returns to block 1030. If the first FCEU 422 instead determines at block 1032 that the asymmetry between the two wing flaps exceeds the asymmetry threshold, the method 1000 of FIGS. 10A-10C proceeds to block 1034.

At block 1034, the first FCEU 422 of FIG. 4 commands the HMA 402 of FIG. 4 into a bypassed mode (block 1034). For example, the first FCEU 422 of FIG. 4 may command the HMA 402 of FIG. 4, via the REU 412 of FIG. 4 and/or the hydraulic module 410 of FIG. 4, into the bypassed mode. Following block 1034, the method 1000 of FIGS. 10A-10C proceeds to block 1036.

At block 1036, the second FCEU 424 of FIG. 4 commands the ACU 408 of FIG. 4 into an active mode (block 1036). In some examples, the second FCEU 424 may command the ACU 408 into the active mode by closing the switch 438 of the ACU 408, by connecting the second electrical system 420 to the alternate electric motor 436 of the ACU 408, and/or by engaging the clutch 440 of the ACU 408. Following block 1036, the method 1000 of FIGS. 10A-10C proceeds to block 1038.

At block 1038, the second FCEU 424 of FIG. 4 commands the ACU 408 of FIG. 4 to control the position of the wing flap (block 1038). For example, the second FCEU 424 of FIG. 4 may command the ACU 408 of FIG. 4, via the alternate electric motor 436 of FIG. 4 and/or the clutch 440 of FIG. 4, to control the position of the wing flap. Following block 1038, the method 1000 of FIGS. 10A-10C ends.

From the foregoing, it will be appreciated that the disclosed distributed trailing edge wing flap systems advantageously include a HMA and an EMA to move a wing flap relative to the fixed trailing edge of an aircraft wing. The HMA is actuatable via pressurized hydraulic fluid to be supplied from a hydraulic system of the aircraft to the HMA via a hydraulic module operatively coupled to the HMA. The EMA is actuatable via an electric motor of the EMA connected to an electrical system of the aircraft. A shaft operatively couples the HMA to the EMA. Rotation of the shaft may be selectively controlled via an alternate control unit operatively coupled to the shaft.

The HMA may advantageously be actuated by any of three independent mechanisms. First, the HMA may be actuated via the hydraulic module when the hydraulic system is operational, functional, and/or active. Second, in the event of a failure of the hydraulic system, the HMA may alternatively be actuated via the shaft under the control of the EMA. Third, in the event of a failure of the hydraulic system and a failure of an electrical system, the HMA may alternatively be actuated via the shaft under the control of the alternate control unit. The EMA may also advantageously be actuated by any of three independent mechanisms. First, the EMA may be actuated via the electric motor when the electrical system is operational, functional, and/or active. Second, in the event of a failure of the electrical system, the EMA may alternatively be actuated via the shaft under the control of the HMA. Third, in the event of a failure of the electrical system and a failure of the hydraulic system, the EMA may alternatively be actuated via the shaft under the control of the alternate control unit.

In some examples, a wing flap system for an aircraft is disclosed. In some disclosed examples, the wing flap system comprises a flap, a first actuator, a second actuator, and a shaft. In some disclosed examples, the flap movable between a deployed position and a retracted position relative to a fixed trailing edge of a wing of the aircraft. In some disclosed examples the first actuator is to move the flap relative to the fixed trailing edge. In some disclosed examples, the first actuator is actuatable via pressurized hydraulic fluid to be supplied from a hydraulic system of the aircraft to the first actuator via a hydraulic module operatively coupled to the first actuator. In some disclosed examples, the second actuator is to move the flap relative to the fixed trailing edge. In some disclosed examples, the second actuator is actuatable via an electric motor of the second actuator connected to a first electrical system of the aircraft. In some disclosed examples the shaft operatively couples the first actuator to the second actuator. In some disclosed examples, the first and second actuators are actuatable via the shaft.

In some disclosed examples, the first actuator is actuatable via the shaft in response to actuation of the second actuator. In some disclosed examples, the shaft is to rotate in response to actuation of the second actuator via the electric motor. In some disclosed examples, the rotation of the shaft is to actuate the first actuator. In some disclosed examples, the first actuator is actuatable via the rotation of the shaft independently of being actuatable via the pressurized hydraulic fluid.

In some disclosed examples, the second actuator is actuatable via the shaft in response to actuation of the first actuator. In some disclosed examples, the shaft is to rotate in response to actuation of the first actuator via the pressurized hydraulic fluid. In some disclosed examples, the rotation of the shaft is to actuate the second actuator. In some disclosed examples, the second actuator is actuatable via the rotation of the shaft independently of being actuatable via the electric motor.

In some disclosed examples, the wing flap system further comprises an alternate control unit including an alternate electric motor and a switch. In some disclosed examples, the alternate control unit is to selectively rotate the shaft in response to a second electrical system of the aircraft being connected to the alternate electric motor via the switch. In some disclosed examples, the first and second actuators are actuatable in response to rotation of the shaft via the alternate control unit.

In some disclosed examples, the switch is operatively positioned between the alternate electric motor and the second electrical system. In some disclosed examples, the switch is actuatable between an open position and a closed position. In some disclosed examples, the alternate electric motor is connected to the second electrical system when the switch is in the closed position.

In some disclosed examples, the flap is a first flap of the aircraft. In some disclosed examples, the switch is controlled via a flight control electronics unit of the aircraft. In some disclosed examples, the flight control electronics unit is to actuate the switch from the open position to the closed position in response to detecting an asymmetry between the first flap and a second flap of the aircraft that exceeds an asymmetry threshold.

In some disclosed examples, the wing flap system further comprises a remote electronics unit, an electronic motor control unit, a first flight control electronics unit, and a second flight control electronics unit. In some disclosed examples, the remote electronics unit is in electrical communication with the hydraulic module. In some disclosed examples, the remote electronics unit is to control the hydraulic module. In some disclosed examples, the electronic motor control unit is in electrical communication with the electric motor. In some disclosed examples, the electronic motor control unit is to control the electric motor. In some disclosed examples the first flight control electronics unit to control the remote electronics unit and the electronic motor control unit. In some disclosed examples, the second flight control electronics unit is to control the alternate control unit.

In some disclosed examples, the remote electronics unit is located at the first actuator, the electronic motor control unit is located at the second actuator, the first flight control electronics unit is located remotely from the remote electronics unit, remotely from the electronic motor control unit, and remotely from the alternate control unit, and the second flight control electronics unit is located remotely from the remote electronics unit, remotely from the electronic motor control unit, and remotely from the alternate control unit.

In some disclosed examples, the first actuator includes a first actuator position feedback sensor and the second actuator includes a second actuation position feedback sensor. In some disclosed examples, the remote electronics unit is to receive first actuator position feedback data sensed by the first actuator position feedback sensor. In some disclosed examples, the electronic motor control unit is to receive second actuator position feedback data sensed by the second actuator position feedback sensor.

In some disclosed examples, the flap includes a flap position sensor. In some disclosed examples, the first flight control electronics unit is to receive flap position data sensed by the flap position sensor.

In some disclosed examples, the aircraft includes a fly-by-wire flight control system and a power architecture having two independent hydraulic systems and two independent electrical systems.

In some examples, a wing flap system for an aircraft is disclosed. In some disclosed examples, the wing flap system comprises a flap, a first actuator, a second actuator, a shaft, and an alternate control unit. In some disclosed examples, the flap is movable between a deployed position and a retracted position relative to a fixed trailing edge of a wing of the aircraft. In some disclosed examples, the first actuator is to move the flap relative to the fixed trailing edge. In some disclosed examples, the first actuator is actuatable via pressurized hydraulic fluid to be supplied from a hydraulic system of the aircraft to the first actuator via a hydraulic module operatively coupled to the first actuator. In some disclosed examples, the second actuator is to move the flap relative to the fixed trailing edge. In some disclosed examples, the second actuator is actuatable via an electric motor of the second actuator connected to a first electrical system of the aircraft. In some disclosed examples, the shaft extends between the first and second actuators. In some disclosed examples, the shaft operatively couples the first actuator to the second actuator. In some disclosed examples, the first and second actuators are actuatable via the shaft. In some disclosed examples, the alternate control unit includes an alternate electric motor and a switch. In some disclosed examples, the alternate control unit is to selectively rotate the shaft in response to a second electrical system of the aircraft being connected to the alternate electric motor via the switch.

In some disclosed examples, the shaft is to rotate in response to actuation of the second actuator via the electric motor. In some disclosed examples, the rotation of the shaft is to actuate the first actuator. In some disclosed examples, the first actuator is actuatable via the rotation of the shaft independently of being actuatable via the pressurized hydraulic fluid.

In some disclosed examples, the shaft is to rotate in response to actuation of the first actuator via the pressurized hydraulic fluid. In some disclosed examples, the rotation of the shaft is to actuate the second actuator. In some disclosed examples, the second actuator is actuatable via the rotation of the shaft independently of being actuatable via the electric motor.

In some disclosed examples, the first and second actuators are actuatable in response to rotation of the shaft via the alternate control unit. In some disclosed examples, the switch is operatively positioned between the alternate electric motor and the second electrical system. In some disclosed examples, the switch is actuatable between an open position and a closed position. In some disclosed examples, the alternate electric motor is connected to the second electrical system when the switch is in the closed position.

In some examples, a method is disclosed. In some disclosed examples, the method comprises commanding a first actuator and a second actuator to move a flap relative to a fixed trailing edge of a wing of an aircraft. In some disclosed examples, the first actuator is actuatable via pressurized hydraulic fluid to be supplied from a hydraulic system of the aircraft to the first actuator via a hydraulic module operatively coupled to the first actuator. In some disclosed examples, the second actuator is actuatable via an electric motor of the second actuator connected to an electrical system of the aircraft. In some disclosed examples, the method further comprises, in response to detecting a failure of the first actuator or the hydraulic system, commanding the first actuator into a bypassed mode and further commanding the second actuator to move the flap relative to the fixed trailing edge. In some disclosed examples, the method further comprises, in response to detecting an asymmetry between the flap of the wing and another flap of another wing of the aircraft while the first actuator is in the bypassed mode, commanding the second actuator into a floated mode and further commanding an alternate control unit of the aircraft into an active mode. In some disclosed examples, the active mode enables the alternate control unit to move the flap relative to the fixed trailing edge to reduce the asymmetry.

In some disclosed examples, the method further comprises, in response to detecting a failure of the second actuator or the electrical system, commanding the second actuator into the floated mode and further commanding the first actuator to move the flap relative to the fixed trailing edge. In some disclosed examples, the method further comprises, in response to detecting an asymmetry between the flap of the wing and another flap of another wing of the aircraft while the second actuator is in the floated mode, commanding the first actuator into the bypassed mode and further commanding the alternate control unit of the aircraft into the active mode.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wing flap system for an aircraft, the wing flap system comprising:
- a flap movable between a deployed position and a retracted position relative to a fixed trailing edge of a wing of the aircraft;
- a first actuator to move the flap relative to the fixed trailing edge, the first actuator being actuatable via pressurized hydraulic fluid to be supplied from a hydraulic system of the aircraft to the first actuator via a hydraulic module located at the first actuator, the hydraulic module being in fluid communication with the hydraulic system and the first actuator;
- a second actuator to move the flap relative to the fixed trailing edge, the second actuator being actuatable via an electric motor of the second actuator connected to a first electrical system of the aircraft; and
- a shaft operatively coupling the first actuator to the second actuator, the first and second actuators being actuatable via the shaft.

2. The wing flap system of claim 1, wherein the first actuator is actuatable via the shaft in response to actuation of the second actuator.

3. The wing flap system of claim 2, wherein the shaft is to rotate in response to actuation of the second actuator via the electric motor, the rotation of the shaft to actuate the first actuator, the first actuator being actuatable via the rotation of the shaft independently of being actuatable via the pressurized hydraulic fluid.

4. The wing flap system of claim 1, wherein the second actuator is actuatable via the shaft in response to actuation of the first actuator.

5. The wing flap system of claim 4, wherein the shaft is to rotate in response to actuation of the first actuator via the pressurized hydraulic fluid, the rotation of the shaft to actuate the second actuator, the second actuator being actuatable via the rotation of the shaft independently of being actuatable via the electric motor.

6. The wing flap system of claim 1, further comprising an alternate control unit including an alternate electric motor and a switch, the alternate control unit to selectively rotate the shaft in response to a second electrical system of the aircraft being connected to the alternate electric motor via the switch.

7. The wing flap system of claim 6, wherein the first and second actuators are actuatable in response to rotation of the shaft via the alternate control unit.

8. The wing flap system of claim 6, wherein the switch is operatively positioned between the alternate electric motor and the second electrical system, the switch being actuatable between an open position and a closed position, the alternate electric motor being connected to the second electrical system when the switch is in the closed position.

9. The wing flap system of claim 8, wherein the flap is a first flap of the aircraft, and wherein the switch is controlled via a flight control electronics unit of the aircraft, the flight control electronics unit to actuate the switch from the open position to the closed position in response to detecting an asymmetry between the first flap and a second flap of the aircraft that exceeds an asymmetry threshold.

10. The wing flap system of claim 6, further comprising:
- a remote electronics unit in electrical communication with the hydraulic module, the remote electronics unit to control the hydraulic module;
- an electronic motor control unit in electrical communication with the electric motor, the electronic motor control unit to control the electric motor;
- a first flight control electronics unit to control the remote electronics unit and the electronic motor control unit; and
- a second flight control electronics unit to control the alternate control unit.

11. The wing flap system of claim 10, wherein the remote electronics unit is located at the first actuator, the electronic motor control unit is located at the second actuator, the first flight control electronics unit is located remotely from the remote electronics unit, remotely from the electronic motor control unit, and remotely from the alternate control unit, and the second flight control electronics unit is located remotely from the remote electronics unit, remotely from the electronic motor control unit, and remotely from the alternate control unit.

12. The wing flap system of claim 10, wherein the first actuator includes a first actuator position feedback sensor and the second actuator includes a second actuation position feedback sensor, the remote electronics unit to receive first actuator position feedback data sensed by the first actuator position feedback sensor, the electronic motor control unit to receive second actuator position feedback data sensed by the second actuator position feedback sensor.

13. The wing flap system of claim 10, wherein the flap includes a flap position sensor, the first flight control electronics unit to receive flap position data sensed by the flap position sensor.

14. The wing flap system of claim 1, wherein the aircraft includes a fly-by-wire flight control system and a power architecture having two independent hydraulic systems and two independent electrical systems.

15. A wing flap system for an aircraft, the wing flap system comprising:
- a flap movable between a deployed position and a retracted position relative to a fixed trailing edge of a wing of the aircraft;
- a first actuator to move the flap relative to the fixed trailing edge, the first actuator being actuatable via pressurized hydraulic fluid to be supplied from a hydraulic system of the aircraft to the first actuator via a hydraulic module operatively coupled to the first actuator;
- a second actuator to move the flap relative to the fixed trailing edge, the second actuator being actuatable via an electric motor of the second actuator connected to a first electrical system of the aircraft;
- a shaft extending between the first and second actuators, the shaft operatively coupling the first actuator to the second actuator, the first and second actuators being actuatable via the shaft; and
- an alternate control unit including an alternate electric motor and a switch, the alternate control unit to selectively rotate the shaft in response to a second electrical system of the aircraft being connected to the alternate electric motor via the switch.

16. The wing flap system of claim 15, wherein the shaft is to rotate in response to actuation of the second actuator via the electric motor, the rotation of the shaft to actuate the first actuator, the first actuator being actuatable via the rotation of the shaft independently of being actuatable via the pressurized hydraulic fluid.

17. The wing flap system of claim 15, wherein the shaft is to rotate in response to actuation of the first actuator via the pressurized hydraulic fluid, the rotation of the shaft to actuate the second actuator, the second actuator being actuatable via the rotation of the shaft independently of being actuatable via the electric motor.

18. The wing flap system of claim 15, wherein the first and second actuators are actuatable in response to rotation of the shaft via the alternate control unit.

19. The wing flap system of claim 15, wherein the switch is operatively positioned between the alternate electric motor and the second electrical system, the switch being actuatable between an open position and a closed position, the alternate electric motor being connected to the second electrical system when the switch is in the closed position.

20. A method, comprising:

commanding a first actuator and a second actuator to move a flap relative to a fixed trailing edge of a wing of an aircraft, the first actuator being actuatable via pressurized hydraulic fluid to be supplied from a hydraulic system of the aircraft to the first actuator via a hydraulic module operatively coupled to the first actuator, the second actuator being actuatable via an electric motor of the second actuator connected to an electrical system of the aircraft;

in response to detecting a failure of the first actuator or the hydraulic system, commanding the first actuator into a bypassed mode and further commanding the second actuator to move the flap relative to the fixed trailing edge; and in response to detecting an asymmetry between the flap of the wing and another flap of another wing of the aircraft while the first actuator is in the bypassed mode, commanding the second actuator into a floated mode and further commanding an alternate control unit of the aircraft into an active mode, the active mode to enable the alternate control unit to move the flap relative to the fixed trailing edge to reduce the asymmetry.

21. The method of claim 20, further comprising:

in response to detecting a failure of the second actuator or the electrical system, commanding the second actuator into the floated mode and further commanding the first actuator to move the flap relative to the fixed trailing edge; and in response to detecting an asymmetry between the flap of the wing and another flap of another wing of the aircraft while the second actuator is in the floated mode, commanding the first actuator into the bypassed mode and further commanding the alternate control unit of the aircraft into the active mode.

* * * * *